United States Patent [19]

Takesue et al.

[11] Patent Number: 5,754,693
[45] Date of Patent: May 19, 1998

[54] METHOD OF OPTICAL RECOGNITION AND CLASSIFICATION OF PATTERNS

[75] Inventors: Toshiharu Takesue, Chiba; Yasuhiro Takemura, Shiroi-machi; Hideki Yamazaki, Kamiaokinishi, all of Japan

[73] Assignee: Sumitomo Osaka Cement Company Limited, Japan

[21] Appl. No.: 403,449

[22] Filed: Mar. 14, 1995

Related U.S. Application Data

[63] Continuation-in-part of Ser. No. 836,659, Feb. 18, 1992, abandoned.

[51] Int. Cl.⁶ .................................................. G06K 9/76
[52] U.S. Cl. .................................. 382/224; 382/210
[58] Field of Search ........................... 382/210, 212, 382/213, 160, 224, 225, 228

[56] References Cited

U.S. PATENT DOCUMENTS

| | | | |
|---|---|---|---|
| 4,177,448 | 12/1979 | Brayton | 382/14 |
| 4,454,610 | 6/1984 | Sziklai | 382/2 |
| 4,745,633 | 5/1988 | Waksman et al. | 382/56 |
| 4,790,024 | 12/1988 | Peppers et al. | 382/32 |
| 4,903,314 | 2/1990 | Fine | 382/210 |
| 5,077,807 | 12/1991 | Bokser | 382/14 |
| 5,222,155 | 6/1993 | Delanoy et al. | 382/30 |
| 5,361,311 | 11/1994 | Wilson | 382/213 |
| 5,371,808 | 12/1994 | Wilson et al. | 382/212 |

OTHER PUBLICATIONS

"In Introduction to Computing with Neural Nets" by Richard P. Lippmann, IEEE ASSP Magazine, Apr. 1987, pp. 1–22.

"Optical Technology and the Problems of Neurocomputers", *Nonlinear Optics*, 1991, vol. 1, pp. 39–49.

*Primary Examiner*—Leo Boudreau
*Assistant Examiner*—Christopher S. Kelley
*Attorney, Agent, or Firm*—Hoffman, Wasson & Gitler

[57] ABSTRACT

The present invention is directed to a method for recognizing and classifying one or more unknown patterns, such as letters or numerals, by comparing these unknown patterns to a set of reference patterns. The unknown patterns, as well as the reference patterns, are irradiated by a coherent or incoherent beam, and correlation outputs are measured which would be at peak value of an auto-correlation output or a cross-correlation output between the unknown patterns and the reference patterns. Membership functions are created for each of the reference patterns, and a membership value is estimated or calculated on the basis of the output correlation between the unknown patterns and the reference patterns. Based upon this membership value, the specific unknown pattern is determined.

20 Claims, 11 Drawing Sheets

CORRELATION OUTPUT INTENSITY

| PATTERN | | MEMBERSHIP VALUE | |
|---|---|---|---|
| | | E | V |
| | H | 1 | 1 |
| | N | 0 | 0 |
| | W | 0 | 1 |
| | ⋮ | | |

| | | | | | | | |
|---|---|---|---|---|---|---|---|
| A | (14.8199) | (44.3925) | A | 100 % | | | |
| E | (80.0164) | (19.1256) | E | 100 % | | | |
| H | (34.1394) | (24.8284) | H | 100 % | | | |
| N | (31.522) | (31.4905) | N | 100 % | | | |
| T | (53.7364) | (30.3136) | T | 100 % | | | |
| L | (55.4004) | (25.0414) | T | 21.843 % | L | 100% | |
| O | (21.5404) | (23.9849) | O | 100 % | | | |
| I | (50.0809) | (26.449) | T | 68.7639% | L | 17.6659% | I 100 % |
| K | (44.2551) | (37.1887) | K | 100 % | M | 64.8192% | |
| M | (41.7666) | (38.7179) | K | 35.378% | M | 100% | |
| V | (14.7009) | (81.8856) | V | 99.0819% | | | |
| W | (36.0289) | (50.3511) | W | 100 % | | | |
| X | (22.8047) | (69.4826) | X | 100 % | | | |
| Y | (21.1552) | (56.2913) | Y | 94.7075% | | | |
| Z | (46.0677) | (45.7495) | Z | 100 % | | | |
| A | (13.215) | (44.5128) | A | 95.0843% | | | |
| E | (75.7679) | (18.4227) | E | 31.8977% | | | |
| H | (34.8843) | (24.9244) | H | 100% | | | |
| N | (30.0191) | (29.4622) | N | 97.7229% | | | |
| T | (51.4392) | (29.238) | T | 100 % | I | 59.5684% | |
| L | (53.1335) | (23.8895) | L | 100 % | I | 3.09244% | |
| O | (19.286) | (24.5148) | O | 100 % | | | |
| I | (47.2472) | (28.3379) | T | 31.782% | I | 100% | |
| K | (44.0927) | (37.9645) | K | 100 % | M | 70.2321% | |
| M | (41.0191) | (40.0013) | K | 10.46% | M | 100% | |
| V | (13.9882) | (81.5805) | V | 100 % | | | |
| W | (35.7778) | (47.0888) | W | 83.8287% | | | |
| X | (22.5819) | (67.8074) | X | 100 % | | | |
| Y | (18.6982) | (57.0579) | Y | 100 % | | | |
| Z | (46.2571) | (42.3353) | K | 5.28399% | Z | 56.1539% | |
| A | (14.9343) | (43.6095) | A | 100 % | | | |
| E | (76.2183) | (17.1847) | E | 46.9098% | | | |
| H | (34.2229) | (23.2564) | H | 100 % | | | |
| N | (29.0664) | (30.7548) | N | 100 % | | | |
| T | (51.3787) | (29.0986) | T | 100 % | I | 61.5845% | |
| L | (53.5556) | (23.098) | L | 100 % | | | |
| O | (18.5556) | (23.597) | O | 84.6132% | | | |
| I | (45.213) | (29.8922) | I | 32.8929% | | | |
| K | (44.1078) | (36.5595) | K | 100 % | M | 64.0783% | |
| M | (40.716) | (39.6279) | K | .356925% | M | 100% | |
| V | (14.0072) | (80.5141) | V | 100 % | | | |
| W | (35.261) | (47.094) | W | 84.0039% | | | |
| X | (21.9362) | (70.4852) | X | 100 % | | | |
| Y | (19.0861) | (55.9987) | Y | 100 % | | | |
| Z | (45.5371) | (44.9375) | Z | 91.707% | | | |

FIG. 18

|  | OVERLAP AREA OF MEMBERSHIP FUNCTION | | |
|---|---|---|---|
|  | E | V | X |
| COMBINATION OF PATTERNS H-N | 0 | 0.75 | 0.75 |
| COMBINATION OF PATTERNS H-W | 0.1 | 3 | 6 |
| COMBINATION OF PATTERNS N-W | 0.75 | 0 | 0.75 |

FIG. 19

|  | MAXIMUM MEMBERSHIP VALUE IN OVERLAP AREA | | |
|---|---|---|---|
|  | E | V | X |
| COMBINATION OF PATTERNS H-N | 0 | 0.5 | 1 |
| COMBINATION OF PATTERNS H-W | 0.2 | 1 | 1 |
| COMBINATION OF PATTERNS N-W | 0.5 | 0 | 1 |

FIG. 20

|  | NUMBER OF TRANSPOSITION AREAS | |
|---|---|---|
|  | 10 | 20 |
| NUMBER OF REFERENCE PATTERNS 6 | 60.67 % | 99.22 % |
| NUMBER OF REFERENCE PATTERNS 7 | 95.13 | 99.96 |
| NUMBER OF REFERENCE PATTERNS 8 | 99.50 | 1 |
| NUMBER OF REFERENCE PATTERNS 9 | 99.95 | 1 |

|  | | MEMBERSHIP VALUE | |
|---|---|---|---|
|  | | E | V |
| PATTERN | H | 1 | 1 |
|  | N | 0 | 0 |
|  | W | 0 | 1 |
|  | ⋮ | | |

METHOD OF OPTICAL RECOGNITION AND CLASSIFICATION OF PATTERNS

This is a continuation-in-part application Ser. No. 07/836,659 filed on Feb. 18, 1992 now abandoned.

BACKGROUND OF THE INVENTION

1. Field of the Invention

The present invention relates to a method of recognition and classification of patterns or an image, to be utilized in the field of optical data processing, on a real-time basis. This invention relates to a method of recognition and classification of patterns to be used particularly for processing of data and information such as associative recognition processing, classification processing in the field of optical measurement and image processing.

The present method of pattern processing can be widely utilized, and applied to all of automation technology fields, including office automation such as in use for figure identification and signature cheque, and factory automation such as in use for product detecting, fault product detecting and defect detecting in factory, and medical field such as in use for X-ray and supersonic scanning cheque, microscopic cheque on tissue, and blood cheque to detect cancer cell, and/or bacteria or pathogenic body. Then, the utilization and/or the application thereof can expand unlimitedly.

2. Description of the Prior Art

There have been proposed two methods: a matched filter method and a joint transformation method as an optical estimation for correlation of patterns, as an optical estimation for the correlation of patterns.

The matched filter method comprises initially Fourier transforming two-dimensionally, each of the reference patterns, irradiating each of the reference patterns with a light beam to produce a so called "Fourier transformation hologram" to be used as a filter, and superposing the Fourier transformation of the pattern to be reviewed on the hologram filter so as to process correlation of the patterns.

The joint transformation method comprises recording a joint Fourier transformation pattern resulting from the pattern to be reviewed and each of the reference patterns, and irradiating the resulting recorded pattern with a plane wave beam, so as to process correlation of the patterns.

Both of the above methods provide a relatively large number of reference patterns, and provide a detection result which has been obtained from the presentation of the pattern to be reviewed on the basis of the pattern having a maximum correlation output. Therefore, the number of the reference patterns to be stored will be increased with increase of the number of the patterns to be reviewed. As a result, the loading of a two-dimensional or three-dimensional spatial photo modulator will be raised, and accordingly, the ability of the recognition-classification apparatus will be significantly limited by the ability of the spatial light modulator. Therefore, it is difficult to provide a practical and efficient apparatus for optically recognition and classification of the patterns in general.

In addition, it has been desired that the number of reference patterns to be reviewed should be raised in practice, in parallel with the number of patterns to be reviewed.

Waksman et al.(U.S. Pat. No. 4,745,633) discloses a system for encoding information from the optical image of an electronic camera, wherein the image is converted into a discrete array of values and the values in the cross section of the array are sampled (circuit 40), marked for transition (circuit 50), and the transition markers are then auto-correlated by circuit 60 to form an auto-correlation function for each cross section.

In auto-correlation processing such as disclosed in U.S. Pat. No. 4,745,633 and U.S. Pat. No. 4,454,610, one has to produce auto-correlations of the pattern to be reviewed with all of reference patterns to which the unknown pattern should be identified or classified.

Therefore, U.S. Pat. No. 4,745,633 uses the same number of the reference patterns in a group to which a pattern to be tested should belong, i.e. 26 reference patterns (A, B, C . . . ) in classifying an alphabetic letter, and 10 reference patterns (1, 2, . . . ) in classifying a figure to be reviewed are needed.

A global summary function as U.S. Pat. No. 4,745,633 discloses is produced by combining mutually the auto-correlation functions in a circuit 70. Then, the global summary function may be used to judge their similarity between a pattern to be reviewed and one of the reference patterns. Therefore, the global summary function is primarily based on the auto-correlations.

The Global summary function has been created by adding the auto-correlation functions derived from only two cross sections of the array (column 10, lines 40 to 47, and see FIG. 6). Further, see column 11, the item of "algebraic comparison of global summary functions"—FIG. 7. The results of the global summary functions are dependent on the direction of cross-section on the image.

Further, U.S. Pat. No. 4,454,610 discloses an apparatus for the automatic classification of patterns in which the intensity or gray level values of selected pixels of digital images of functions of position-invariant transforms of patterns to be classified, displayed as intensity functions are correlated with one or more stored sets of values, each such stored set of values corresponding to one of the classes into which the unclassified patterns are to be classified. The same discussion above on Waksman can be applied on this patent. The number of the stored sets in this prior art shall be the number of the classes to which the unclassified patterns are to be classified. Therefore, when the numerical figure should be classified as shown in FIGS. 10A to 10G of that patent, said necessary number of the reference patterns is 10 (1, 2, . . . 9 and 0).

SUMMARY OF THE INVENTION

Accordingly, an object of the present invention is to provide an improved optical method of recognition and classification of patterns to be reviewed, wherein the necessary number of the reference patterns to be recorded can be significantly lessened, and then, a number of patterns can be recognized and classified in parallel.

It is another object of the present invention to provide an optical method of recognition and classification of patterns to be reviewed, on real time basis.

BRIEF DESCRIPTION OF THE DRAWINGS

The objects and features of the present invention will become more apparent from the consideration of the following detailed description taken in conjunction with the accompanying drawings in which:

FIGS. 8a–8c shows schematically how to gain the patterns of the mutual correlation resulting from the patterns "E" and 'H', to be used for testing or learing, wherein the two patterns "E" and 'H' are represented on the display with some vertical slide, and at the same horizontal position, in FIG. 8(a), and further, the two patterns are slipped off or lagged in a shift length of the pattern size as shown in FIG. 8(b), and then, FIG. 8(c) shows the correlation light intensity distribution of the patterns "E" and "H" as formed, and then, the central larger circle indicates a higher peak light intensity, and the smaller circles up and below the central circle indicate the response to the horizontal bar, and the smaller circle horizontally apart from the central circle indicates the response to the vertical bar;

FIG. 10 is a table showing the recognition result with regard to the unknown patterns, wherein the second column shows the output resulting from transformation with a reference pattern "E", and the third column shows the output resulting from transformation with a reference pattern "V", and the forth and fifth columns show the results as produced by using an experimentally obtained "AND" calculation method in accordance with the present invention, the percetage values means the probability of the recognition result;

FIG. 18 shows a table showing a calculated overlap area of the membership functions, resulting from the pairs of patterns: three combinations 'H-N' 'H-W' and 'N-W' to be discriminated, where the values are the overlapped area e.g. between the H-E membership function curve which is calculated on the basis of the correlation between 'H' and the reference pattern "E", and the N-E membership function curve which is calculated on the basis of the correlation between 'N' and the reference pattern "E", when FIGS. 15 and 16 are overlapped;

FIG. 19 shows a table showing a calculated maximum membership values, resulting from the pairs of patterns : three combinations 'H-N', 'H-W' and 'N-W' to be discriminated, where the values are membership values at the cross points e.g. between the H-E membership function curve which is calculated on the basis of the correlation between 'H' and the reference pattern "E", and the N-E membership function curve which is calculated on the basis of the correlation between 'N' and the reference pattern "E", when FIGS. 15 and 16 are overlapped;

FIG. 20 shows a table showing a calculation result of the necessary number of the reference patterns, and its probability, to recognize 1,000 patterns;

DETAILED DESCRIPTION OF PREFERRED EMBODIMENTS

Figure 1:
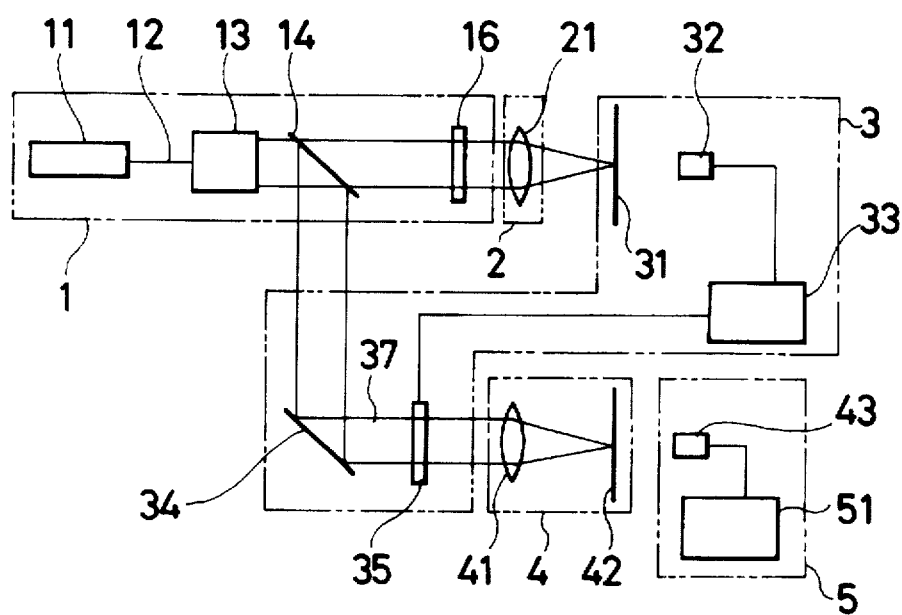
FIG. 1 shows schematically a structure of a typical joint Fourier transformation optical system to be used for an optical correlation processing system of the present invention.

The present invention provides a method of preprocessing data of cross-correlation of an unknown pattern with a plurality of predetermined reference patterns by using optical means and a computer in which the optically measured data are fed and manipulated, thereby resulting in significantly efficiency for recognizing and classifying an unknown pattern or image as belonging to an associated known pattern classes, on real time basis.

In this description, a specific pattern which has a specific known shape (e.g. triangle or circle or 'H' and 'V') and in a certain case has a leukocyte A (a shape of leukocyte A in a photograph) which shall belong to a leukocyte A. Further, the specific pattern is used to produce a membership function, on the basis of the correlation with each of reference patterns, which membership function is used to judge how much the unknown belongs to the specific pattern or is classified to the class to which the unknown pattern should be classified. E.g. the shape detected by a microscope can be judged as to how much the detected shape shall be classified to a leukocyte. Then, "unknown pattern" represents a pattern to be recognized or identified, or a pattern to be classified to a certain class. "Reference pattern(s)" or a set of reference patterns is used to produce a cross-correlation with specific patterns, thereby obtaining a membership function therewith, and then, identifying or recognizing or classifying unknown patter(s) by producing a cross-correlation of an unknown pattern with each of the reference patterns so as to obtain membership value(s) from which judgement as to which class of patterns the unknown pattern belongs to, and further a probability of identification can be calculated.

"Class" represents a known and concrete pattern or class to which the unknown pattern should belong, and having some feature of patterns.

A "membership function" can be produced from the set of multiple measurement data of the cross-correlation between a specific pattern and a reference pattern by calculating a certain representative value (e.g. average of the data) and a value representing distribution of the data (e.g. a standard deviation), and estimating a membership function provided that a maximum value of the distribution is one, and the width of the plateau of the membership function will represent a deviation of the distribution. The mutual overlap of membership functions will represent some similarity between patterns to be reviewed, and these patterns have somehow correlation of shape.

In accordance with the present invention, a representative value will refer to a value representing the mean of the distributed data, that is, in some cases, to means value including an arithmetic means, geometric, and harmonic means, and an average value, and further may include a central value of the distributed data. The representative value will determine a membership function, and therefore, will determine a membership value. In accordance with the present invention, a parameter to represent the degree of the deviation of the data represents the distribution state of the data, and may include a standard deviation, a mean deviation, and a degree of deviation and so on. This parameter is used to determine a membership function and therefore, a membership value. In accordance with one embodiment for producing a membership function in our method, a membership function can be formed by providing that the representative value is at the central position of a graphical plateau having a width of one time of the parameter value, and a height of one, and both sides of the plateau have a slope having the width of 2.5 times of parameter until the height is zero at the both ends. In our method, the shape of the membership function can not be limited to the above description, and can be in form of Gaussian distribution or normal distribution.

Therefore, you can understand that the representative value and the parameter can be calculated on the basis of the above definitions by selecting an appropriate definitions. Then, a membership function can be obtained by one appropriate form.

In accordance with the present invention, a correlation is respectively and optically estimated between respective one pattern (a pattern to be reviewed) which should belong to a certain class, and each of the reference patterns, so as to gain the correlation output showing the common features between each of the respective reference patterns and each of the patterns to be reviewed or classified, resulting in the set of the correlation output for a pattern to be reviewed.

In accordance with our method of using a computer, classification information useful in recognizing and/or classifying an unknown pattern or image as belonging to a specific class, can be obtained, on real time basis, which comprises the steps of (a) predetermining reference patterns which are an appropriate and preliminary set of patterns; (b) measuring optically, multiple times enough to produce statistically significant result, the output of correlation between each of predetermined reference patterns and a specific pattern to which an unknown pattern or image shall be classified, as belonging to a specific class; (c) providing to said computer a set of the measured data of the correlation outputs in response to each of said predetermined reference patterns and the specific pattern; (d) causing said computer to manipulate said measured data, thereby making a membership function by (i) calculating a distribution and its standard deviation value for each set of the correlation outputs, from said set of the measured data of the correlation outputs measured in the step (b); (ii) determining a representative value for each set of the correlation outputs, from said distribution, for each of said predetermined reference patterns and the specific pattern; (iii) determining a parameter to represent the degree of the deviation of said measured data of said correlation outputs; (iv) making a membership function corresponding to each of said reference patterns, on the basis of said representative value and said calculated parameter; (e) repeating the steps (b) to (d) exception of replacing the specific pattern with another specific pattern, as belonging to specific class(s), until there are obtained all of the membership functions in regard to each of the specific patterns; (g) measuring optically, the correlation between the unknown pattern and each of the predetermined reference patterns; (h) providing to said computer a set of the measured data in the step (g), of the correlation outputs in response to each of said predetermined reference patterns: (i) estimating respectively the membership values of the predetermined reference patterns, assigned to each of the specific patterns, on the basis of a set of the measured data; (j) estimating a smallest membership value or an average membership values from the membership values obtained in the step (i); (k) using the resulting smallest membership value or the average as a degree to judge how much the unknown pattern belongs to the specific pattern.

In accordance with one embodiment of the present invention, the correlation output may be a whole light power found in the distribution range of a cross-correlation output between the specific pattern or unknown pattern and each of said reference patterns. The output of correlation comprises an average light power found in the distribution range of a cross-correlation output between the specific pattern or unknown pattern and each of said reference pattern. The correlation output can be preferably normalized by all light quantity from all of the patterns to be reviewed or unknown pattern and/or reference patterns detected by said two-dimensional image sensor.

In accordance with one embodiment of the present invention, the correlation output can be obtained by using a matched filter. The correlation output has been obtained by separately executing a jointed Fourier-transformation of the specific pattern with each of said reference patterns so as to obtain a plurality of correlation intensity patterns, and subsequently optically Fourier-transforming each of said resulting intensity patterns. The correlation output can be obtained by executing together a jointed Fourier-transformation of the specific pattern with each of said reference patterns so as to obtain a plurality of correlation intensity patterns, and subsequently optically Fourier-transforming together said resulting intensity patterns. The correlation output can be a light power which has been obtained by superposing the specific pattern with each of said reference patterns expressed in term of light transmission distribution or light reflection distribution, and subsequently irradiating the formed superposed pattern, with an incoherent beam to form reflection or transparent light patterns.

Further, in accordance with another embodiment of the present invention, the appropriate set of reference patterns can be determined by the steps of (a) predetermining an appropriate candidate reference patterns; (b) measuring optically multiple times enough to produce statistically significant result, the output of correlation between each of the reference patterns and a specific pattern to be reviewed, or to which an unknown pattern shall be classified, or shall belong; (c) providing to said computer a set of the measured data of the correlation outputs associated with each of the reference patterns; and (d) causing said computer to manipulate said set of the measured data, thereby making a first membership function by (i) calculating a representative value for each set of the correlation outputs, from said set of the measured data of the correlation outputs measured in the step (b), for each of the reference patterns; (ii) calculating a parameter to represent the degree of the deviation of said measured data of said correlation outputs ; and (iii) making a first membership function corresponding to each of the reference patterns in response the specific pattern, on the basis of said representative value and said calculated parameter; and then, (e) repeating the steps (b) to (d) exception of replacing the specific pattern with another specific pattern, as belonging to specific class(s), until there are obtained all of the membership functions in regard to each of the specific patterns; (f) selecting a set of first reference patterns by (I) calculating respectively an area of the overlapping range in which said first membership functions mutually overlap between two of all candidate reference patterns; or respectively a maximum membership value within the overlapping range in which the first membership functions mutually overlap between the two of all candidate reference patterns; (II) using said respective area of the overlapping range or said maximum membership value, respectively as a standard to determine the extent of overlap between the two candidate reference patterns each in response to the specific pattern; (III) determining a combination of reference patterns having the smallest overlap as an appropriate first reference patterns to be used for recognition and/or classification of unknown patterns, on the basis of said overlapping area; (g) measuring optically, the correlation between the unknown pattern and each of the first reference patterns; (h) providing to said computer a set of the measured data in the step (g), of the correlation outputs in response to each of said first reference patterns: (i) estimating respectively the membership values of the first reference patterns, assigned to each of the unknown patterns, on the basis of a set of the measured data; (j) estimating a smallest membership value or an average membership values from the membership values obtained in the step (i); (k) using the resulting smallest membership value or the average as a degree to judge how much the unknown pattern belongs to the specific pattern.

Further, in accordance with other embodiment of the present invention, the selection of a set of the first reference patterns having the least overlap is carried out by the steps of (1) counting the number of regions in which the area of the overlapping range at each of candidate reference patterns, at each of the candidate reference patterns, between two of the specific patterns which belong respectively to known classes exceeds a given predetermined area for each of the candidate reference patterns; (2) choosing a reference pattern having the least number of the regions, and adding the reference pattern having the second lowest number of the regions, to produce a set of reference patterns; (3) counting among all combinations of two of the specific patterns, the number of the cases in which the number of reference patterns in the set matches the number of the overlap ranges of the membership functions between two of specific patterns in response to each of the reference patterns having a larger area than the predetermined area; (4) stopping to add candidate reference pattern(s) to the set of reference patterns, and fixing the set of reference patterns at which the counted number of said combinations of reference patterns is less than a certain predetermined number. Then, the selection of the first reference patterns having the least extent of overlap can be carried out by the following steps of (1) counting the number of regions in which the maximum membership value in the overlapping range at each of the candidate reference patterns, between two of the specific patterns which belong to known class exceeds the predetermined value for each of the candidate patterns; (2) choosing a reference pattern having the least number of the regions, and adding such reference pattern having the second minimum number of the regions to the set of reference patterns, to produce a set of reference patterns; (3) counting among all combinations of two of the specific patterns, the number of the cases in which the number of reference patterns in the set matches the number of the overlap ranges of the membership functions in response to each of the reference patterns having a larger value than a given predetermined value; (4) stopping to add candidate reference pattern to the set of reference patterns, and fixing the set of reference patterns at which the counted number of said combinations of reference patterns is less than a predetermined number.

In accordance with other embodiment of the present invention, it is provided that the membership function has a convex curve so that a fuzzy system theory can be applied. Further, the correlation output is a whole light power found in the distribution range of a cross-correlation output between the respective specific patterns or unknown pattern and each of said reference patterns.

In accordance with other embodiment of the present invention, the correlation output can be an average light power found in the respective distribution range of a cross-correlation output between the specific patterns or unknown pattern and each of said reference patterns. Further, the correlation output with the specific patterns or unknown pattern may be the output signals from a two-dimensional image sensor. The correlation output is normalized by all light quantity from all of the specific patterns or unknown pattern (the patterns to be reviewed) and/or reference patterns detected by said two-dimensional image sensor.

In accordance with one embodiment of the present invention, the correlation output can be a light power which has been obtained by superposing the specific pattern with each of said reference patterns expressed in term of light transmission distribution or light reflection distribution, and subsequently irradiating the formed superposed pattern, with an incoherent beam to form reflection or transparent light patterns.

The present invention can be applied to recognize or identify a pattern having a concrete shape, such as a letter or a figure. Furthermore, the present invention can be applied to identify a pattern having no concrete shape, such as a signature, or a HIV virus, as having a certain feature in its shape, by discriminating from different signature or different virus. In accordance with the present invention, examples of reference patterns may include a concrete shaped pattern, such as a square, a circle, a triangle, and an alphabetic letter such as E, V and X, and examples of patterns to be reviewed include a written letter, a written signature, and a pattern observed by a microscope. Furthermore, a class to which a reviewed pattern should belong, or an unknown pattern should be classified may include a class of H and so, and a certain man's signature, and a HIV virus.

In accordance with the present invention, the set of the resulting correlations will be represented by a membership function involving the time-depending fluctuations of the spatial light modulator, and the fluctuation or change of the correlations due to speckle noise in the system.

When an unknown pattern to be reviewed is desired to be recognized and/or classified as one which should belong to a certain class, the comparison by said resulting membership values is carried out on the basis of the respective correlations with each of the reference patterns, and the degree of matching with the certain class to which the pattern shall belong can be gained by a minimum value(s) of the membership values or the average of the membership values in a certain region.

The membership function in our method is essentially based on cross-correlation data measured by an optical means.

In our method, membership functions are calculated from the cross-correlations between each of the specific patterns or an unknown pattern to be classified and each of the predetermined reference patterns. The cross-correlation can be produced by two dimensional Fourier transformation of each of the specific patterns with each of the reference patterns. Such Fourier transformation (pattern) can be a plurality of times measured by an optical means such as a video camera and a video board to obtain a cross-correlation output which can be manipulated in a computer.

In accordance with the present invention, the data of the obtained correlation outputs is in a set and has distribution and some deviation. Then, we can provide a membership functions on the basis of the set of the data of the correlation outputs.

In order to classify efficiently the unknown pattern to be identified or to be classified into a certain class with a small number of the reference patterns, a couple of reference patterns with less overlap of membership functions in response to the unknown pattern to be reviewed should be selected or determined, and then, the membership functions in response to such small number (e.g. couple) of the reference patterns can be used to identify the unknown pattern.

Then, the classification of the pattern to be reviewed is carried out by comparing with the resulting membership functions on the basis of the correlation with each of the reference patterns, and the degree of matching can be gained by the minimum value of the membership values or the average value of the membership values in a given region.

Our inventive method does not use so many reference patterns, as shown in the prior art, 15 alphabetic letter patterns (A, E ... Z) can be identified by using merely two reference patterns (E and V) (see FIGS. 9 & 10) in accordance with the present invention.

Our method of pattern processing can be widely utilized, and applied to all technology fields, including office automation, e.g. letter identification, and signature cheque, factory automation, e.g. product detecting and fault product detecting and defect detecting in factory, and medical field, e.g. X-ray, supersonic scanning cheque, and microscopic cheque on tissue, and blood cheque to detect e.g. cancer cell, and bacteria or pathogenic body.

Then, the utilization is not limited to the above, and can expand unlimitedly. Therefore, our method should not be restricted to such utilization. Our method relates to a method of preprocessing data of cross-correlation of an unknown pattern with a plurality of predetermined reference patterns, by using optical means and a computer in which the pattern data are fed and manipulated, thereby resulting in significantly efficiency for recognition and/or classification of the unknown pattern or image as belonging to an associated known pattern classes, on real time basis.

The present invention is further illustrated by the following examples, but should not be interpreted for the limitation of the invention.

EXAMPLE 1

FIG. 1 shows schematically one preferred embodiment of the inventive arrangement for recognition and classification, in accordance with the present invention.

The optical arrangement view of FIG. 1 comprises a pattern output means 1, an optical Fourier transforming means 2, a pattern output means 3, an optical Fourier transformation means 4, and an optical detection means 5.

A coherent beam 12 emitting from a source 11, such as a semiconductor laser or a gas laser, is transformed by a beam expander 13 into a beam having an appropriate diameter, and is divided by a beam splitter 14 into the two beams (1' and 1").

A pattern to be reviewed and a group of reference patterns which have been displayed on a display plane 16 are read out by a coherent beam 1', and then Fourier transformed by a Fourier transformation lens 21, forming joint Fourier transformation patterns on a screen 31. The resulting joint Fourier transformation patterns are read out by a two-dimensional image sensor 32, and the resulting pattern signals are transmitted to a liquid crystal driving circuit 33, which enables to display the patterns on a liquid crystal light valve (hereinafter refer to as "LCLV") 35, which patterns are read out by a beam 37, and again Fourier transformed by a Fourier transformation lens 41 forming Fourier transformation patterns on a screen 42, from which the resulting patterns to indicate correlations (referring to as "correlation") are detected by a two-dimensional image sensor 43.

A general type of such liquid crystal light valve may be a liquid crystal panel used for a liquid crystal TV and a display for a personal computer.

The respective correlation between the pattern to be recognized and each of the reference patterns is detected in the above described optical arrangement, and the resulting correlation is respectively processed in a computer 51, so as to gain respective membership function in correspondence respectively to each of the reference patterns. The recognition of unknown pattern can be determined by respective comparison to each of the resulting membership functions with the unknown pattern.

Figure 2:
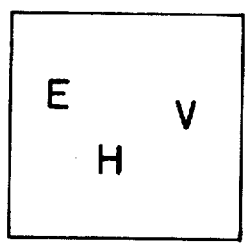
FIG. 2 shows schematically one specific pattern to be reviewed 'H' and a set of reference patterns "V" and "E" as displayed on the plane of a display device, wherein a joint Fourier transform correlator is used.
Figure 3:
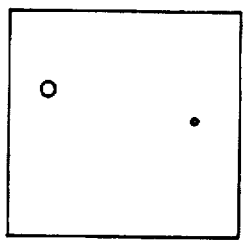
FIG. 3 shows a schematic view of displayed correlation outputs displayed on a display device; bigger one corresponding to the combination of "E" and 'H', and the other one corresponding to the combination of "V" and 'H', wherein a joint Fourier transform correlator is used.

One example of the methods of preparation of a membership function will be described as follows:

For example, the group of reference patterns is two letters: E and V, and a pattern to be reviewed (recognized or/and classified) is H, and those patterns are displayed such that H is at the center, and E and V are provided on the circumference of a circle, as shown in FIG. 2. The output from the two-dimensional image sensor 43, which is the correlation outputs resulting from the pattern "H" respectively with each of the reference patterns, appears at the positions respectively corresponding those of the displayed reference patterns, as shown in FIG. 3, which patterns are detected as a presentation of light intensities (i.e. intensity pattern).

The values of this correlation are indicated such that the higher the value, the larger the displayed circle becomes. The two parallel vertical bars and horizontal bar which constitutes the letter "H" will respond to each of the reference patterns and then, the resulting correlation outputs are as indicated in FIG. 3, which shows a significant difference in the correlation values. The auto-correlation which appears at the position of optical axis is not shown in FIG. 3 because it is not relevant.

The resulting correlation output intensity signals are sent to a computer 51, and stored in its memory. A series of patterns to be reviewed (recognized or/and classified) are sequentially transmitted to a display 16, and the peak value of the correlation intensities as displayed is stored in a memory of the computer 51, in sequence. There operations are repeated necessary times (multiple times) to gain a plurality of the correlation outputs respectively for each of the reference patterns.

The peak values of the correlation output intensities will fluctuate due to the influence of speckle (background) noise of the coherent beam, the time-dependent instability of the performance of the pattern display 16 and LCLV 35, as well as the input timing of the signals from the two-dimensional image sensor 32. Therefore, one time measurement of the correlation output might not result in correct recognition and classification. Accordingly, the measurement is repeated several necessary times to gain a plurality of data, from which the average of the peak values in response to each of the reference patterns and its standard deviation are calculated, so as to gain a respective membership function of the specific pattern to each of the patterns "E" and "V". The degree of the similarity of the specific pattern to be reviewed as belonging to a certain class can be determined a calculation of a membership value and its comparison by using convex "fuzzy system theory" sets.

For example, the range between the average value minus the standard deviation and the average value plus the standard deviation is assumed as the membership value of one, and the outside of the range from the average value minus 3 times the standard deviation to the average value plus 3 times the standard deviation, i.e. the range below the average value minus 3 times the standard deviation and the range above the average value plus 3 times the standard deviation is assumed as the membership value of zero. In the range from the average value minus 3 times the standard deviation to the average value minus the standard deviation, and in the range from the average value plus the standard deviation to the average value plus 3 times the standard deviation, the membership value is indicated by the linear function, i.e. the membership function has a slope from the average value plus or minus the standard deviation to the average value plus or minus 3 times the standard deviation, as represented in FIGS. 4 and 5.

Figure 4:
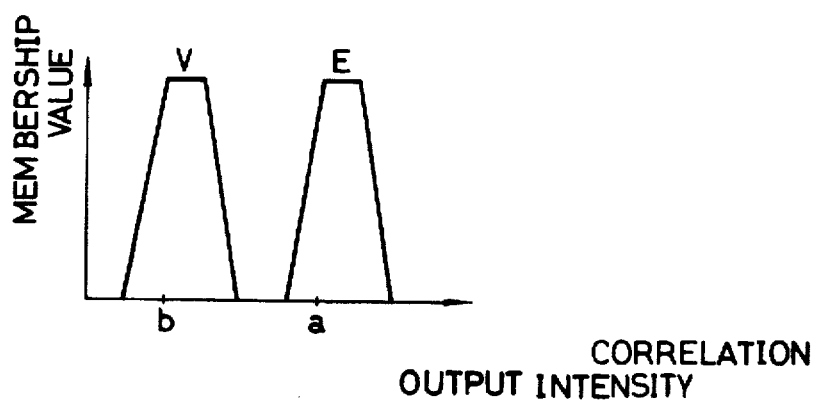
FIG. 4 shows a schematic illustration showing membership functions produced on the basis of the respective correlation output resulting from each of the reference patterns "V" and "E" with one specific pattern 'H' to be reviewed in accordance with the inventive method of recognition and classification of the pattern, wherein "a" indicates the position corresponding to the correlation output resulting from one pattern 'H' to be reviewed and a reference pattern "E", and "b" indicates the position corresponding to the correlation output resulting from one pattern 'H' to be reviewed and a reference pattern "V"

FIG. 4 shows a graphic illustration displaying membership functions as indicating the peak value of the correlation output produced on the basis of the respective correlation resulting from each of the reference patterns "V" and "E" with one pattern "H" to be reviewed. Similarly, all of the membership functions as to all of the classes to which the patterns are to be classified are produced, and stored together with information of such classes, in a computer 51. However, in the case where the standard deviation resulting from a plurality of times of the measurement is significantly small, it is necessary to add somehow correction of the values.

When an unknown letter pattern is presented in place of "H" in FIG. 2, the resulting peak value in the correlation output intensity range resulting from the response to each of the reference patterns is sent to a computer 51, in which the peak value is compared respectively with each of the membership functions corresponding to each of the patterns to be recognized and/or classified.

Figure 5:
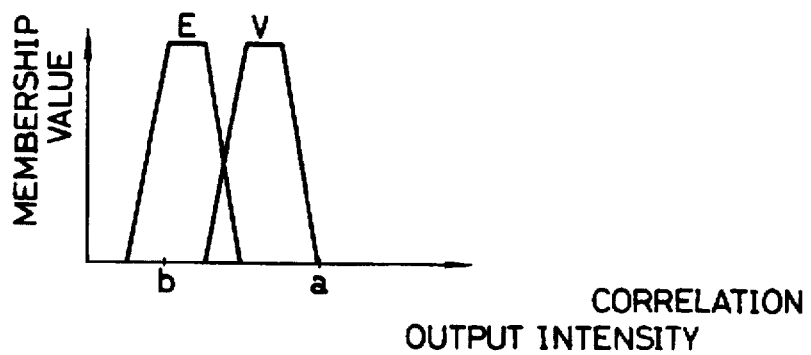
FIG. 5 is a graph showing the relation of the membership functions produced on the basis of the respective correlation of each of the reference patterns "V" and "E" with the other specific pattern e.g. 'N' to be reviewed in accordance with the inventive method of recognition and classification of the pattern, wherein "a" indicates the position corresponding to the correlation output resulting from one pattern e.g. 'N' to be reviewed and a reference pattern "E", and "b" indicates the position corresponding to the correlation output resulting from one pattern e.g. 'N' to be reviewed and a reference pattern "V"
Figures 6, 7, 8:
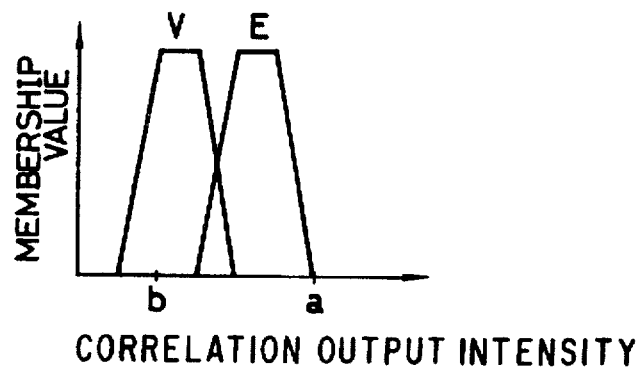
FIG. 6 shows a graph showing the relation of the membership functions produced on the basis of the respective correlation of each of the reference patterns "V" and "E" with another specific pattern e.g. 'W' to be reviewed and a reference pattern "E", and "b" indicates the position corresponding to the correlation output resulting from one pattern e.g. 'W' to be reviewed and a reference pattern "V".
FIG. 7 shows a table showing schematically the membership values with regard to the measured correlation of each of the reference patterns "E" and "V" with specific patterns to be reviewed e.g. 'H', 'N', 'W' in accordance with the inventive method of recognition and classification of pattern.

For example, the membership functions corresponding to each of patterns of "H", "W" and "N" to be reviewed, respectively in response to the reference patterns "E" and "V" are shown respectively in FIGS. 4, 5 and 6. It is assumed that the peak values in the correlation output intensity ranges in response of an specific pattern to each of the reference patterns "E" and "V" are found respectively at the position (a) of the coordinate for the pattern "E", and at the position (b) for the pattern "V".

Then, FIG. 7 is a table displaying how high the membership values in response to each of specific patterns (which may include H, N or W) are respectively at the positions (a)

and (b). Although this table indicates only either of one or zero, but the height of each position can be located at a slanting zone (a slope zone), and therefore the membership value is an analog value.

When an "AND" estimation on the basis of a "fuzzy system theory" is calculated on the membership values as shown in FIG. 7, the result is a minimum value of the membership values corresponding respectively to each of the patterns to be reviewed. Therefore, the membership values in response to the unknown patterns are 1, 0 and 0 respectively in response to the patterns "H", "W" and "N". Accordingly, there is a 100% probability that the latter unknown pattern is "H". On the other hand, when several "0" are included in the minimum value of the membership values, the minimum value will indicate the probability of the other unknown pattern.

Further, the arithmetic mean of the membership values can be calculated from FIG. 7. In this case, the arithmetic means of the membership value in response to the patterns "H", "N" and "W" are respectively 1, 0.5 and 0. Therefore, the degree of the matching to each of the patterns can be estimated. However, the estimation can be accomplished even when there is zero correlation with a certain reference pattern. Therefore, the "AND" estimation on the basis of "fuzzy system theory" gives less error than the arithmethic mean estimation can be used as an assistant estimation method where the AND estimation can not provide a basis to determine the unknown pattern. When zero is the only membership value to only one reference pattern, and the membership values to the other reference patterns are one (which may result from some shifts from the correct position when estimating the average), the AND estimation technique can not provide the correct answer. In this case, the arithmetic mean estimation can be used as a second means for gaining the degree of the matching.

In this example, all of the membership functions have a graphical plateau. However, it should be noted that this need not be the case, and any shape can be included provided that any concave portion, i.e. a convex "fuzzy system theory" set is utilized: i.e. a convex "fuzzy system theory" set (i.e. it must have a maximum) can not be used.

The correlation output intensities can be detected over the entire light quantity in response to the range or area of the correlation output other than the peak value, or can be detected by its average light quantity. That is, where to represent the correlation output intensities can be done by using either one of that they are detected over the whole light quantity in response to the range or area of the correlation output other than the peak value, and of that they are detected by its average light quantity.

In general, the correlation output can be represented by the following equation, wherein the two patterns are represented respectively by A(x,y) and B(x,y);

$$I(x',y')=\iint A(x,y) \cdot B^*(x'-x,y'-y)dxdy$$

wherein * denotes a complex pair intensity.

It is apparent from this equation that the correlation output has the range or area which is twice the range of the pattern. Therefore, the whole light intensity or the average light intensity from the range can be detected over the range of the correlation.

FIG. 8 shows schematically how to represent the patterns of the mutual correlation outputs resulting from the response of the two patterns "E" and "H", wherein the two patterns are represented on the display with some vertical slide to avoid the overlap. In this case, the correlation light intensity in response to the patterns "E" and "H" is at the peak, when the two patterns are at the same horizontal position as shown in FIG. 8(a). When the patterns are offset with one another as shown in FIG. 8(b), one of the vertical bars of the pattern "H" vertically overlaps with the vertical bar of the pattern "E". Consequently, the correlation light quantity can be detected by a value less than the peak value.

FIG. 8(c) shows the correlation light quantity distribution of the patterns "E" and "H" as formed, with the central larger circle representing the peak light quantity, and the smaller circles above and below the central circle representing the response to the horizontal bar, and the smaller circle to the left of the central circle representing the response to the vertical bar. Therefore, the entire light quantity or the average light quantity of those patterns provides information which properly responds to the features of each of the patterns. This information is not found utilizing the peak light quantity.

Figure 9:
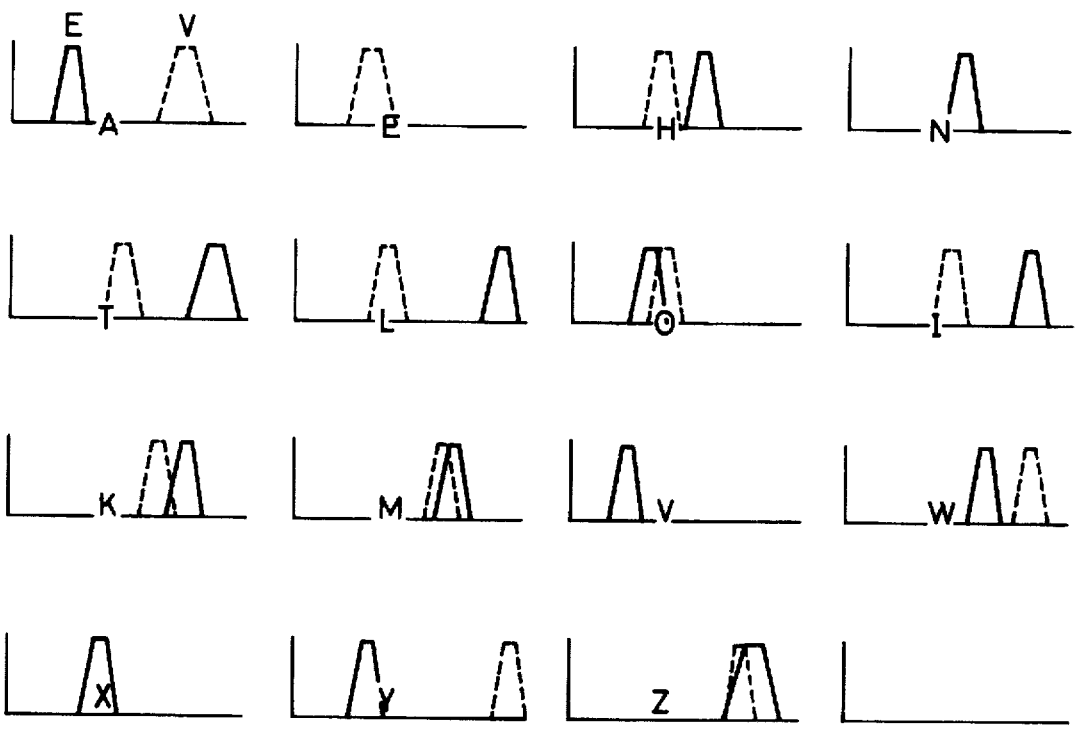
FIG. 9 shows 15 graphs showing the relation of the membership functions produced on the basis of the respective correlation of each of the specific patterns (A, E, H, N, T, L, O, I, K, M, V, W, X, Y and Z) to be reviewed, with the two reference patterns (E, V) in accordance with the inventive method of recognition and classification of pattern, wherein a solid line indicates a membership function prepared on the basis of the correlation with a reference pattern "E", and a dotted curve indicates a membership function prepared on the basis of the correlation with a reference pattern "V"

FIG. 9 shows 15 graphs showing the relation of the membership functions produced on the basis of the respective correlation of each of the patterns (A, E, H, N, T, L, O, I, K, M, V, W, X, Y and Z) to be reviewed, with the two reference patterns (E, V) in accordance with the inventive method of recognition and/or classification of unknown pattern, wherein the solid line indicates the membership functions in response to the pattern "E", and the dotted line indicates the membership functions in response to the pattern "V", and further, the average light intensity is indicated on an abscissa of the graphs. There is found only one membership function in some cases, but this results from the fact that the other membership function that is not shown is beyond the graph scale.

FIG. 10 is a table showing the recognition result with regard to the 15 specific patterns, wherein the second column parenthesized shows the output resulting from transformation with a reference pattern "E", and the third column parenthesized shows the output resulting from transformation with a reference pattern "V", and the forth and fifth columns show as produced by using an experimentally obtained AND calculation method in accordance with the present invention, and the probability of the recognition result, wherein the specitic patterns to be reviewed are 15 patterns of the alphabetic letters; A, E, H, N, T, L, O, I, K, M, V, W, X, Y and Z, and those letters are presented three times, that means that the test of multiple measurement are carried out three times. The resulting probabilities of each of the letters are indicated, which the probabilities are estimated on the basis of the "fuzzy system theory" AND calculation. The letters shown in the first column are the fed patterns, and the numerical values in the second and third columns within the parenthesis are the average light intensities of the correlations in response respectively to the reference patterns "E" and "V". Further, the letters at the forth column is the letter which was determined or recognized in accordance with the present invention, on the basis of the "fuzzy system theory" AND calculation using the membership values as shown in FIG. 9. The numerical values in percentage at the fifth column mean the probability of the identification. These values at the fifth column is estemated as follows; e.g. in case of "H", min[(membership value at a),(membership value at b)] =1×100%=100% (see FIG. 4). The term "min[A,B] means less value selected from A and B. Therefore, the value of probability can be estimated from less membership value at a or b.

There are some instances in which one unknown pattern can be represented by two or three possible patterns. However, using the highest probability as shown in columns five, seven and nine, all of the unknown letters can be properly recognized or classified using only two reference patterns "E" and "V". Such good results could not be achieved in the prior art correlation processing method using commonly an auto-correlation as disclosed in U.S. Pat. Nos. 4,745,633 and 4,454,610.

It is apparent from the results of FIG. 10 that there are found two groups: one group of T, L and I; and another group of K and M in which groups the letters are especially apt to be confused with each another. This is due to the fact that each of the letters in its respective group has common features. In this situation, the letter with the highest probability of recognition is selected so as to easily provide the recognition or the classification of the letters. However, even when it is desired to obtain complete recognition of the letters using the small number of the reference patterns, the complete recognition can be accomplished merely by simple processing in accordance with the present invention. The processing in which one reference pattern to produce membership function without any overlapping range in response to a confusing letter should be entered or added into the set of reference patterns to accomplish the complete recognition or classification of the letters. The "fuzzy system theory" AND calculation can enable to identify different letters, even when it has only one membership value of zero.

Furthermore, the present invention can deal with the situation in which the classes or patterns to be classified or recognized are larger, i.e. the number of the classes or patterns is increased. The membership functions in response to the raised number of the patterns can be easily estimated or gained in accordance with the above-described method. In this case, it is unnecessary to change weights of the connections to connect neurons of an artificial neural network. When the classes or patterns to be reviewed are increased in the artificial neural network, one would think that problems of increased retraining time due to the increased number of the neurons which are used would result. However, this has not been found to be the case, using the method of recognition or classification of patterns, according to the present invention.

When this method is applied to the association of the patterns, the width or the range of the membership function may be increased or made larger than the range of the above-described membership functions. The original (perfect) pattern can be associated or regenerated from an imperfect pattern by using the wider range of the correlation intensities, i.e. extending the range of the membership functions to the lower correlation size. Furthermore, the major patterns can be associated or regenerated from the information or the patterns containing excess information, by using the wider range of the correlation intensities, i.e. by extending the range of the membership functions to the higher correlation side.

Additionally, judgement can be used as to whether the pattern is imperfect or not. In this case, a process in reverse to the association processing can be used. When the correlation output is found to exceed the area of the membership function which is obtained by including the fluctuation of the intensities due to the optical arrangement, e.g. when the observed correlation intensity expands beyond the value of the average plus 3 times the standard deviation, it must be decided whether the pattern is imperfect or defective.

In this example, 15 specific patterns can be recognized or identified by using merely two reference patterns. The performance of this method is as follows:

When the dynamic range of the correlation output to be detected is 1:100, and the area in which the membership value to one membership function is not zero is 10, there are provided $10^N$ of orthogonal ranges for N reference patterns. Therefore, the patterns to be recognized may be easily positioned or distributed in such ranges, and then, significantly, many different patterns can be recognized or classified by using merely a few number of the reference patterns. Further, this method is based on the "fuzzy system theory" AND estimation, and then, when the "fuzzy system theory" judgement can be implemented, it is unnecessary to assign the membership functions to each of the completely orthogonal ranges. Consequently, the number of the patterns to be recognized or classified are significantly increased to a relatively large number.

Additionally, when the peak values of the correlation output, and the average light quantity of the receiving (detection) range corresponding to the area of the correlation pattern are used for the basis to calculate a membership function, two different type of information in response to each of the reference patterns can be produced. Accordingly, the number of the necessary reference patterns can be further reduced, and then, more reliable recognition and classification can be obtained from this information.

In this example, a joint Fourier transform correlator was used for an optical system to produce the correlation output. Then, this case is advantageous in that addition of reference pattern(s) and rewriting out are easily effected. When it is desired to improve the performance of recognition and classification of the unknown patterns, a joint Fourier transform correlator is not advantageous. Where the reference patterns and the patterns to be reviewed are Fourier transformed in parallel, the contrast in the multiple interference fringes formed on the screen 31 of FIG. 1 is decreased with the increased number of the reference patterns. In this situation, the intensities of the correlation outputs are lowered, so as to decrease the dynamic range to which the membership functions are assigned or allotted, thereby lowering substantially the performance of recognition of the patterns.

Accordingly, the above described correlation processing method, to avoid the lowering of the correlation output, is more efficient. This processing method will be illustrated in the following example.

EXAMPLE 2

Figure 11:
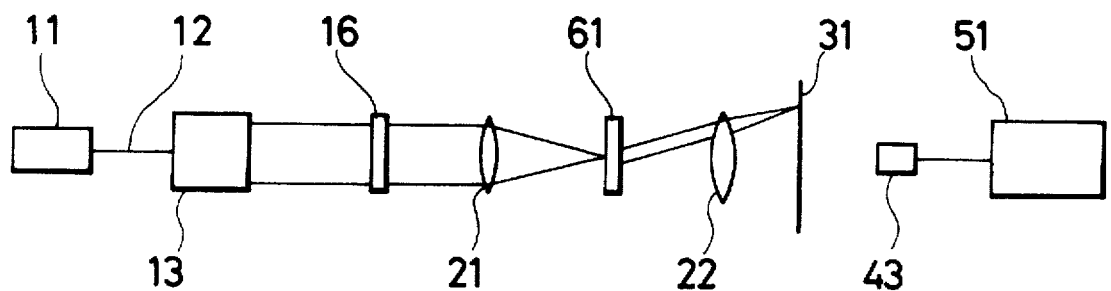
FIG. 11 shows schematically the structure of one of the optical correlation processing apparatus using matched filtering in accordance with the inventive optical method of recognition and classification.

FIG. 11 shows schematically the structure of one of the optical correlation processing apparatus using matched filtering. FIG. 11 illustrates an optical arrangement of regenerating a known matched filter. A matched filter 61 has a multiple record which has been stored by changing an irradiation direction of plane wave beam respectively to each of the reference patterns. As shown in FIG. 11, the beam 12 emitting from a laser source 11 is expanded to an appropriate diameter of the beam by a beam expander 13, and irradiates a pattern to be recognized, which has been formed on a display 16. The beam having a complex amplitude distribution of the pattern is Fourier transformed by a Fourier transformation lens 21, and irradiates a multiple interference fringe pattern formed on a matched filter. Thereby, a diffraction beam is emitted in a direction of a plane wave which has been used for forming the Fourier transformation patterns of reference patterns on the filter, from the corresponding Fourier transformation patterns of the reference patterns, having the same frequency as that of the pattern to be recognized.

The diffraction beam is focused on a screen 31 by a focusing lens 22, forming a cross-correlation between the pattern to be recognized and each of the reference patterns, and further forming a convolution between them. Because the positions of the cross-correlation patterns to be represented have been known, the peak values of the correlation output intensities at those position or the whole light quantities around those positions can be easily detected.

Further, correlation output intensities relating to the other patterns to be recognized are similarly detected. The process for gaining a membership function is similar to that of Example 1, and then, is not described again.

In this example, a matched filter does not overlap Fourier components among the reference patterns, and then, the reduction of the contrast in the correlation outputs due to the increased number of the reference patterns is not very great. Therefore, the reduction of the dynamic range to be assigned to the membership functions is not very great, and then, significantly more patterns can be recognized by using less number of the reference patterns.

Furthermore, another type of a joint Fourier transform correlator can be used to give similar processing result. For example, an array of lenses can be used to Fourier transform separately, and in parallel, each of the reference patterns and patterns to be recognized. Thereby, the problem of overlapping Fourier components of each of the reference patterns to lower the contrast of cross-correlation intensities to result from the reference patterns and the patterns to be recognized is resolved. Further, addition of reference patterns and substitution of reference patterns can be enabled, giving flexibility of the processing. For example, it can satisfy the need of proportional substitution of the reference patterns, when the set of the reference patterns can not completely recognize (separate) the patterns to be recognized.

Examples 1 and 2 use a coherent beam resulting in a very strong parallel shift. This results from the fact that the correlation outputs as formed are in parallel shifted or moved depending on the parallel shift of the input patterns.

The next Example illustrates a relatively simple optical arrangement which can be easily integrated.

EXAMPLE 3

Figure 12:
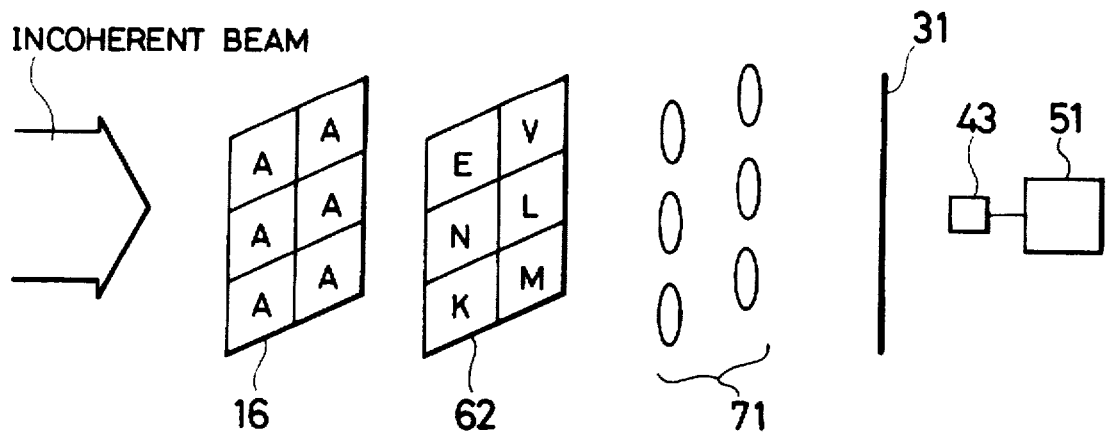
FIG. 12 shows a schematic illustration of an optical system of the other type of the optical correlation processing apparatus to be used for the inventive optical method of recognition and classification.

FIG. 12 shows a schematic illustration of an optical system of the known type using an incoherent beam. In this optical arrangement, a display 16 and a mask 62 having the reference patterns are closely assembled, so as to focus an output of a product between a pattern to be recognized on the display 16 and each of the reference patterns formed, on a screen 62. An array 71 of focusing lenses is provided, and then the outputs produced by these lenses are detected by a two dimensional photo image sensor 43.

The pattern to be recognized is arranged in array on a display 16, using each of elements corresponding respectively to each of the reference patterns included on a mask 62.

In this example, a cross correlation peak resulting from the pattern to be recognized and each of the reference patterns is detected. Following the above operation, other patterns to be recognized are displayed in sequence on the display, and then, membership functions corresponding to each of the reference patterns are prepared for each of the patterns to be recognized. Subsequently, the steps described in Examples 1 and 2 are accomplished. However, there is no allowance to parallel shift of input patterns, but the device in accordance with this method has a simple structure.

EXAMPLE 4

FIG. 1 shows schematically the structure of a typical joint Fourier transformation optical system to be used as an optical correlation processing system.

The optical arrangement of FIG. 1 includes a pattern output means 1, an optical Fourier transformation means 2, a pattern output means 3, an optical Fourier transformation means 4 and an optical detection means 5.

A coherent beam 12 emitting from the laser source 11 reads out a pattern to be recognized and each of reference patterns formed on a display 16. These patterns are focused on a screen 31 by a Fourier transformation lens 21, forming joint Fourier transformation patterns. These Fourier transformation patterns are read out by a two dimensional photo image sensor 32, and displayed on a LCLV 35 of electric addressing type, through a liquid crystal driving circuit 33. The displayed patterns are read out by a beam 37, which beam is focused on a screen 42 by a Fourier transformation lens 41, forming correlation intensities which are detected by a two dimensional image sensor 43.

In the inventive method, a correlation between a pattern to be recognize and each of reference patterns is detected by the above-mentioned optical arrangement. Each of the membership functions is prepared on the basis of respective correlation between each of the patterns to be reviewed and each of the reference patterns. The prepared membership functions are respectively compared with each other so as to obtain recognition or classification of the unknown patterns to be reviewed.

Figure 13:
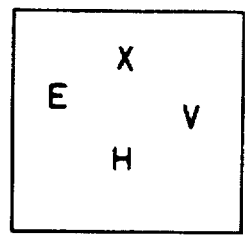
FIG. 13 shows schematically one pattern (H) to be reviewed and reference patterns (E, V, X) in case which a jointed Fourier transform correlator is used for recognition and classification of pattern.
Figure 14:
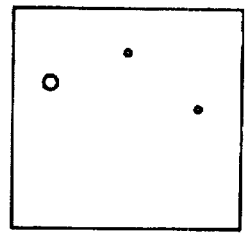
FIG. 14 shows schematically the respective cross correlations of one pattern to be reviewed and the reference patterns as shown in FIG. 13, in case which a jointed Fourier transform correlator is used for recognition and classification of pattern.

The membership function is produced as follows:

FIG. 13 shows schematically the respective position of one pattern (H) to be reviewed and reference patterns (E, V, X) as presented on a display correlator 16, in case which a joint Fourier transform correlator is used for production of the membership function. Each of the patterns is apart from each other at similar distance, in which the reference patterns E, V and X are provided on the circumference of a circle having a center in the middle of the pattern H. The output of the respective correlation between the letter H and each of the reference letters, i.e. the output from a two-dimensional image sensor 43 is respectively represented at the positions corresponding respectively to the positions of each of the reference letters, and can be detected as light intensities as shown in FIG. 14.

In this situation, when the peak value of the correlation output is higher, the circle as shown is larger. Each of the two parallel vertical bars and horizontal bar constituting the letter "H" will respond to each of the vertical bar(s) and horizontal bar(s) of the reference patterns, to produce the difference in correlation output as shown in FIG. 14. The output of the auto-correlation which will appear on an optical axis is not shown in FIG. 14. FIG. 14 does show schematically the respective cross-correlations on the basis of one pattern to be reviewed and the reference patterns as shown in FIG. 13, in the case in which the jointed Fourier transform optical correlator is used for recognition and classification of a pattern.

The output of each of the detected correlations is sent to a computer 51 of FIG. 1, and stored therein. Each of the patterns to be reviewed is shown on a display device 16. The respective peak of the outputs as shown on the display device 16 is detected and stored respectively in a computer 51. Furthermore, this processing is carried out several times for each of the patterns to be reviewed. Fluctuation of the peaks of the correlation output is sensed, due to speckle noise of the coherent beam, time passage instability of the display device 16 and the LCLV 35, as well as the fluctuation of input timing of the signals fed from a two-dimensional image sensor 32. A single measurement of the correlation outputs does not necessarily produce creditability data to obtain the correct recognition and classification of the unknown pattern. Therefore, in accordance with the method of the present invention, an average of the peak of the correlation output respectively in response to the patterns E, V and X, and the standard deviation of the measured output is calculated. The respective membership function of the correlation outputs regarding each of the patterns E, V and X is assumed to be the shape of a trapezoid, e.g. the membership value at the range from the average value to over the standard deviation is assumed to be 1, and the membership value at the range from the average plus three times the standard deviation is zero, so that the slope of the trapezoid shape has the length of one to three times that of the standard deviation.

Figure 15:
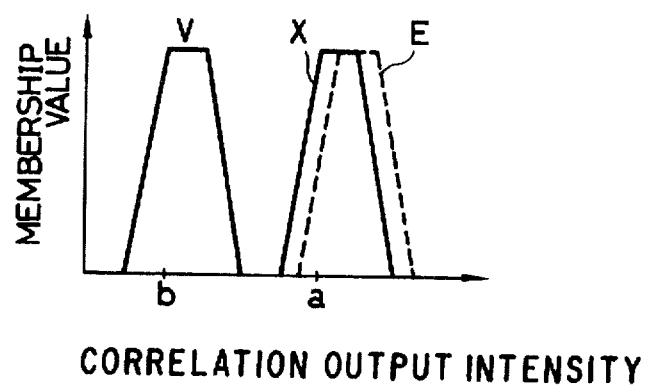
FIG. 15 shows a graph showing schematically the relation of the membership functions produced on the basis of the respective correlation output of each of the reference patterns (V, X, E) with one pattern (H) to be reviewed in accordance with the inventive method of recognition and classification of pattern, wherein the dotted curve for "E" indicated a membership function prepared on the basis of the correlation with a reference pattern "E", and further wherein"a" indicates the position corresponding to the correlation output resulting from an unkown pattern and a reference pattern "E", and "b" indicates the position corresponding to the correlation output resulting from the unknown pattern and a reference pattern "V"

FIG. 15 illustrates the relation of the membership functions produced on the basis of the respective correlation of each of the reference patterns (V, X, E) with one pattern (H) to be reviewed in accordance with the method of recognition and classification of the pattern in accordance with the present invention. In this graph, "a" indicates the position corresponding to the correlation output resulting from the combination of one pattern 'H' to be reviewed and a reference pattern "E", and "b" indicates the position corresponding to the correlation output resulting from the combination of one pattern 'H' to be reviewed and a reference pattern "V".

The membership functions respectively regarding to all of the reference patterns to be used are prepared, and they, together with information of the reference patterns to be used are stored in a computer 51 in FIGS. 1, 11 or 12. A rough correction should be carried out if necessary because the standard deviation may be exceptionally low only from the small number of measurement. Further, An unknown pattern to be reviewed can be recognized by counting a membership value of the respective membership function in response to each of the reference patterns with each of unknown patterns, and then the minimum membership value among the counted membership values or the average of the counted membership values can be used to determine whether the unknown pattern belongs to the specified class. Accordingly, with only small number of the reference patterns as small as possible, a high probability of recognition or to reduce error of recognition as well as to reduce significantly needed time for recognition or classification of patterns is provided.

The appropriate set of reference patterns can be obtained as follows: FIG. 15 shows a graph illustrating the relation of the membership functions produced on the basis of the respective correlation of each of the reference patterns (V, X, E) with one pattern (H) to be reviewed in accordance with our method of recognition and classification of the pattern.

Figure 16:
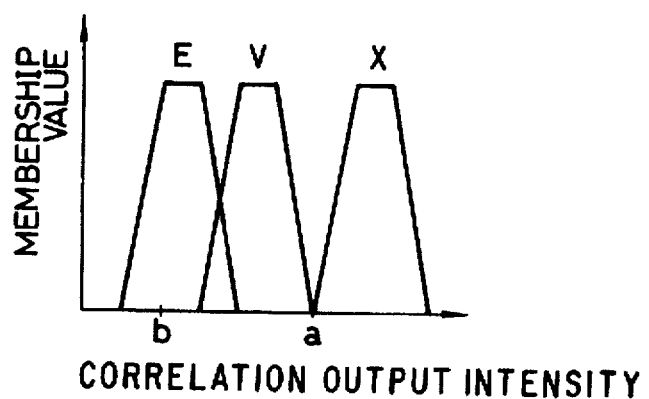
FIG. 16 is a graph showing the relation of the membership functions produced on the basis of the respective correlation of each of the reference patterns (V, X, E) with another specific pattern 'N' wherein "a" indicates the position corresponding to the correlation output resulting from an unkown pattern and a reference pattern "E", and "b" indicates the position corresponding to the correlation output resulting from the unkown pattern and a reference pattern "V"
Figure 17:
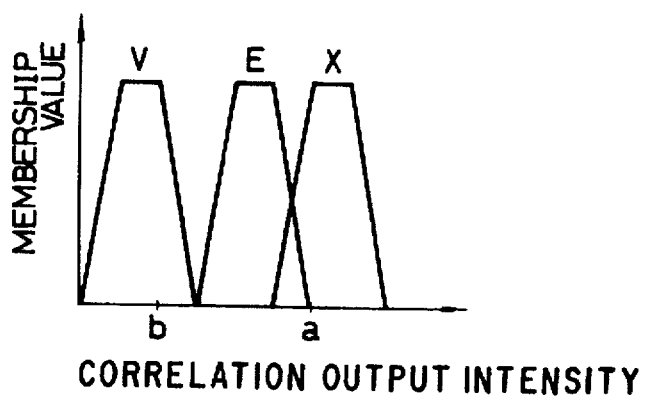
FIG. 17 is a graph showing the relation of the membership functions produced on the basis of the respective correlation of each of the reference patterns (V, X, E) with the other specific pattern 'W', wherein "a" indicates the position corresponding to the correlation output resulting from an unkown pattern and a reference pattern "E", and "b" indicates the position corresponding to the correlation output resulting from the unkown pattern and a reference pattern "V"

FIGS. 16 and 17 are graphs respectively showing the relation of the membership functions produced on the basis of the respective correlation of each of the reference patterns (V, X, E) respectively with another pattern to be reviewed, and with the other pattern to be reviewed.

The following processing should be carried out to recognize an unknown pattern with the number of reference patterns maintained as low as possible. Initially, the area of the range of the overlapping of the membership functions relating to the same reference pattern is regarded as a degree of overlapping, and then, the number of the regions in which the area of overlapping is larger than the predetermined value is counted. The reference pattern having the second lowest number would be added to the reference pattern having the least number and they would be added to the set of the reference patterns. This processing should be repeated to produce appropriate result of recognition or classification of patterns.

Next, the number of the regions in which the area of the overlapping range in response to the patterns to be reviewed exceeds the predetermined area for each of the reference patterns is estimated, and the appropriate set of reference patterns is determined by adding the reference pattern with the minimum number in order from the least number of the regions into the set of the reference patterns to produce a new set of reference patterns.

Among all of the combinations between one specific pattern and another specific patterns to be learned for producing the membership values in response to each of the reference patterns, the number of the overlapping regions of the membership functions in response to the reference pattern, having an larger area than the predetermined area is estimated for each combination of the specific patterns. The number of the combination at which the number of the overlapping regions matches the number of the reference patterns is then counted. Additional reference patterns should not be added to the set of the reference patterns when the number of the reference patterns is at which the counted number of the combination is less than the predetermined number.

For example, the species of the combination of two patterns selected from three patterns H, N and W is three, and then, the membership functions for the three species are prepared. The ranges of overlapping for each of the reference patterns are measured, and the result is shown in FIG. 18.

This table illustrate a calculated overlap area of the membership functions, resulting from the combination of patterns: three combinations 'H-N', 'H-W' and 'N-W' to be discriminated, where the values are each of membership values at the cross points e.g. between the H-E membership function curve and the N-E membership function curve when FIGS. 15 and 16 are overlapped. Each of the reference patterns "E", "V" and "X" can be used to improve performance of pattern classification process, so as to produce an appropriate set with one of the reference patterns.

When the area of overlapping of the membership functions in response to each of the reference patterns is larger, it can be more difficult to recognize the patterns. Accordingly, when it is desired to recognize completely the patterns, the case in which the overlapping area is relatively large is not good. Assuming that the case in which the overlapping area is larger than 0.5 is confusing because error of the recognition can occur. Then, the number of the regions in which the overlapping area is larger than 0.5 is counted. Then, such number in regard to each of the reference patterns E, V and X is counted to be respectively 1, 2, and 3. Then, the pattern "E" having minimum overlapping degree is selected, and subsequently, the pattern "V" having the next minimum overlapping area is selected. In this case, the set of the reference patterns has 2 patterns, i.e. couple of reference patterns and the number of the regions in which the overlapping area of the membership functions is larger than 0.5 is one among two combinations of the two reference patterns E and V. Therefore, the number of the combinations at which the number of said regions matches the number of the reference pattern is zero. Consequently, these three patterns can be recognized or classified by using only a set of two reference patterns E and V, thereby, rendering the pattern X unnecessary. If several of the combinations at which the number of regions matches the number of the reference patterns, it might be somehow difficult to recognize some of the patterns to be tested. In such case, a further reference pattern is not added to the set of reference patterns. In other words, when the prepared membership functions greatly overlapped, it will be difficult to discriminate the unknown patterns from each other.

A rational set of the reference patterns can be selected on the basis of another standard. First of all, the maximum membership value in the overlap range in which the membership functions formed from cross-correlation of the patterns to be reviewed overlap each other is regarded as a degree of overlap, whereby, the number of the regions in which the maximum membership value is larger than the predetermined value is counted. The pattern with least such number is in sequence added to the old set of the reference patterns, so as to produce a new set of the reference patterns. Among all combinations of two reference patterns, the number of the cases in which the number of the selected (or fixed) reference patterns contained in the set matches the number of the regions in which the membership functions in response to the same reference pattern having the overlap area larger than the predetermined value is counted. When the counted number becomes less than the desired number, the addition of further reference pattern to the set of the reference patterns is stopped.

For example, since there are three combinations resulting from three patterns H, N and W, the maximum membership value in the overlap range of each of the membership functions in response to each of the reference patterns is estimated or measured, and the result is shown in FIG. 19. When the maximum membership value in the overlap range of the membership functions in response to each of the reference patterns is higher, it will be difficult to recognize or to discriminate the two patterns to be reviewed. Therefore, when it is desired to discriminate completely the two patterns, the case in which the maximum membership value is considerably higher than zero is not good. The region in which the maximum membership value in the overlap range of the membership function curves in response to each of the reference patterns is higher than 0.5 should be regarded as confusing. The number of the regions in which such maximum value is higher than 0.5 is counted to be 1, 2 and 3 respectively in regard to the reference patterns E, V and X. Therefore, the pattern E having least overlapping is selected, and then, the pattern V having next less overlapping is selected as a reference pattern. Consequently, the set of the reference patterns has two patterns. The number of the regions in which the maximum value is higher than 0.5 among the overlap range of the membership function curves is 1 for all combinations of patterns to be reviewed. Hence, the reference patterns to discriminate the pattern are the patterns E and V, and the pattern W is not necessary.

Where an overlap area of the membership functions is used as a determination as to whether the pattern to be reviewed should belong to the reference patterns, the range wider than the width of the standard deviation can correspond to the slope of the trapezoid of the membership function curve, and the probability of detecting the correlation pattern within this range will be statistically 33 percent. Thus, the overlap area can indicate the distribution of its probability, and therefore, when unknown pattern is recognized, high adaptability will be found. On the other hand, when the maximum membership value in the overlap range is used as a determination as to whether the pattern to reviewed should belong to the reference patterns, the worst value in the recognition processing can be considered in the recognition processing.

The membership values resulting from the correlation of each of unknown patterns and the respective membership function of each of the reference patterns can be estimated, and then, the minimum value of the membership values or the average of the membership values can be estimated to be used as a standard of the recognition of the unknown pattern.

FIG. 19 shows a table provided with calculated maximum membership values, resulting from the pair of respective patterns to be discriminated, where the values are membership values at the cross points e.g. between the H-E membership function curve and the N-E membership function curve when FIGS. 15 and 16 are overlapped. Each of the reference patterns "E", "V" and "X" may be used so as to select an appropriate combination with one of the reference patterns. There is possibility that the worst membership value is 0.2 with respect to the patterns H and W using the reference patterns E and V. In this case, the two pattern can not be discriminated. However, this case is very rare, and usually does not occur in practice.

The following consideration can be taken on the above methods. For example, where the reference patterns without less overlap at Fourier transform plane are represented by N, the number of patterns to be reviewed or recognized is M, the range having the width of three times the standard deviation is R, and the dynamic range of the detector is D, then the range without overlap, i.e. the number of orthogonal regions, is represented by the function:B=D/R. In this regard, the term of "orthogonal region" is defined as a region to which one pattern is assigned so that the pattern is not confused with a second pattern. Assuming that the spatial frequency of the pattern to be reviewed will have random distribution, it can be understood in term of probabilities (statistics). The number G in which N of the reference patterns can be entered into B of the regions, in regard to one specified class: $G=B^{(N+M)}$. On the other hand, a complete recognition will require that M of the classes have respectively one difference region, in all of the cases.

Therefore, the number of such cases is $_GP_M$. Then, the probability thereof P is defined in the following equation:

$P=_GP_M/G$

Assuming that the classes to be reviewed are 1,000, and the number of the orthogonal regions are 10 or 20, it will be reviewed as many times as necessary, resulting in the information shown in FIG. 20, the term "transposition areas" in the table represents the number of the "orthogonal regions". It is apparent from this table that the necessary number of reference patterns will be respectively 8 and 7 when the number of the orthogonal regions is 10 or 20. Therefore, the degree of overlap of the membership function curves should be considered to determine whether additional reference pattern should be added to the set of the reference patterns, which will lead to the combinations of reference patterns to discriminate unknown patterns.

Using the set of the reference patterns E and V, a method of pattern recognition will now be described. When an unknown pattern is used in place of the letter "H" in FIG. 13, the respective peak of the correlation outputs in response to each of the reference patterns is detected and stored in a computer 51 of FIG. 1. This information is compared with the membership function curves of each of the patterns to be recognized. For example, the membership function curves are estimated respectively on FIGS. 15, 16 and 17. The respective peak of the correlation output resulting from with the unknown pattern is observed, i.e. the outputs corresponding respectively to the position of "a" point for the reference pattern E and "b" point for the reference pattern V.

FIGS. 18 and 19 shows tables illustrating respectively the calculated overlap area of membership function and maximum membership value in the overlap area of the membership functions, resulting from the combinations of patterns to be discriminated : 'H-N', 'H-W' and 'N-W' and each of the reference patterns "E", "V" and "X", in order to select an appropriate combination with one of the reference patterns. In this example, the resulting membership values are analog in nature, as shown in the tables, indicating the value at the range of the slope of the trapezoid of the membership function curves.

Figures 21, 22:
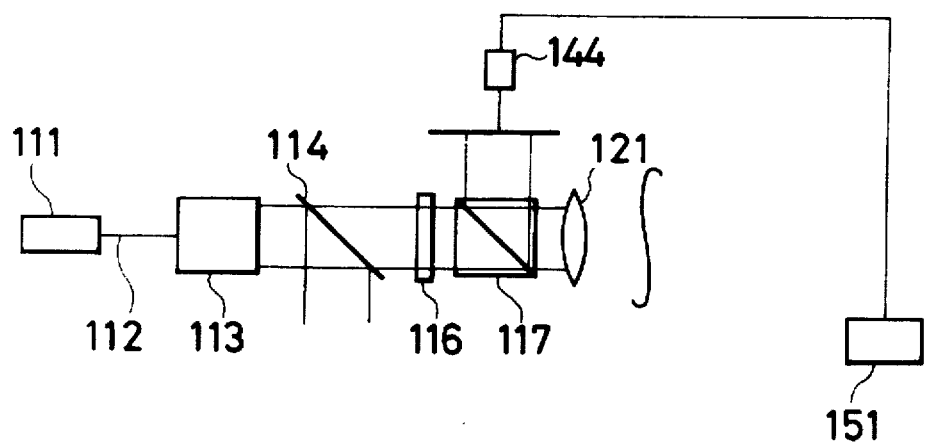
FIG. 21 shows a table showing membership values with regard to the measured correlation output of each of the reference patterns "E" and "V" with each of specific patterns; e.g. 'H', 'N', 'W'... in accordance with the inventive method of recognition and classification of patterns.
FIG. 22 shows schematically a portion of the optical system for normalization of the correlations as detected, in accordance with the inventive optical method of recognition and classification.

FIG. 21 shows a table showing how much (or high) the membership values in response to each of unknown patterns (H, N and W) are respectively at the positions "a" and "b".

The membership values of FIG. 21 suggests that a fuzzy system theory AND calculation can be utilized to determine the minimum of the membership value in response, respectively, to each of the patterns to be recognized. In this instance, the minimum of the membership value is 1, 0 and 0, respectively, in response to the reference patterns H, W and N. Therefore, the unknown pattern has a 100% probability of being an H. On the other hand, when there are found several cases in which the minimum is not zero, the degree as to whether the pattern should belong to the specified class can be judged on the basis of the minimum.

Furthermore, the arithmetic mean of the membership value as shown in FIG. 21 used to judge such degree, i.e. the patterns H, W and H in regard to an unknown pattern, is respectively 1, 0.5 and 0. Therefore, the degree of recognition of an unknown pattern can be confirmed or determined. However, where the arithmetic mean is used, there is possibility of error correlation (the membership value is 0) with a certain reference pattern, but the answer can be obtained. The "fuzzy system theory" AND calculation can avoid error, but the arithmetic mean can be used when the "fuzzy system" calculation is difficult. For example, when the membership value is 0 for one of the reference patterns, but the values to the other reference patterns is 1, and the AND calculation does not give correct answer, the arithmetic mean should then be used as a next means.

In this example, part of the membership function curve is provided with a plateau, and the curve of the membership function can be any shape having no convex, to which the "fuzzy system theory" can be applied. In this example, the standard deviation is taken as a basis for preparation of membership functions, and the width of three times the standard deviation is regarded as a degree of the range of the membership function. For example, when the range in which the membership value is 1 shall have a width of two times the standard deviation, the correlation output can be detected with a degree of accuracy of about 97% in a statistic view. Therefore, about 100% of the classes to be recognized can be detected, but the membership function will be broaden, and it would become slightly more difficult to discriminate it from the other classes.

The correlation output can be detected from the entire range of the output pattern except for the peak value, to obtain the entire light power or the average light power of the detection range. The correlation output I(x', y') can be represented by the following equation wherein the two patterns are represented by A(x, y) and B(x,y).

$$I(x',y')=\iint A(x,y) \cdot B^*(x'-x,y'-y)dxdy$$

wherein * denotes a complete paired (conjugated) quantity.

From this equation, it is apparent that the correlation output has the width of two times the diameter of the pattern. Therefore, the entire light power or average power in this range can be taken from the peak value.

FIG. 8 shows schematically how to obtain the pattern distribution of the mutual correlation resulting from the two patterns "E" and "H", to be used for recognition and classification of an unknown pattern. In this case, the pattern E and the pattern H are vertically shifted to avoid the overlap. The output of the correlation between the patterns E and H becomes a peak value as shown in FIG. 8(a), when the two patterns are completely overlapped, and the light power due to the correlation can be lower than the peak value, since one of the vertical bars of the pattern H is aligned with the vertical bar of the pattern E as shown in FIG. 8(b) when the two patterns are shifted a particular distance.

FIG. 8(c) shows the light power of the correlation between the patterns E and H, wherein the larger circle at the center indicates the light power of the peak, and the smaller circles above and below this larger circle indicate the power of the horizontal response, and the smaller circle to the left of the larger circle indicates the power of the vertical bar. Therefore, those powers or average powers depict a non-peak light power feature for each of the patterns.

FIG. 9 shows 15 graphs showing the relation of the membership functions produced on the basis of the respective correlation of each of the specific patterns (A, E, H, N, T, L, O, I, K, M, V, W, X, Y and Z) to be reviewed, with the two reference patterns (E, V). The solid line curve indicates the membership function in regard to the pattern E, and the dotted line indicates the membership function in regard to the pattern V. Furthermore, the average light power of the correlation output is represented by the abscissa of the graph. In some cases, only one membership function is shown, suggesting that a second function is not included due to the scale of the graph.

FIG. 10 is a table showing the recognition result as well as the probability of the recognition result with regard to the 15 specific patterns to be reviewed, as produced by using an experimentally obtained AND estimation method. The specific patterns are the same as in FIG. 9, wherein three time tests of multiple measurements are carried out by using "fuzzy system theory" AND calculation, to present the recognition result of each of the letters. The resulting degrees of classification to each of the letters are indicated, said degrees being estimated on the basis of the "fuzzy system theory" AND estimation. The letters shown in the first column are input patterns, and the numerical values in the parentheses of the second and third columns are the average light quantities of the correlations in response respectively to the reference patterns "E" and "V". The letters in the forth column represent the letter which was given or recognized by the "fuzzy system theory" AND estimation using the membership values as shown in FIG. 9. The numerical values in percentage in the fifth column are the probability of the recognition of the unknown pattern.

Although there are some instances in which one unknown pattern can be represented by two or three possible patterns, by using the highest probability of recognition as shown in columns five, seven and nine, all of the unknown letters can be properly recognized and classified using the two reference patterns "E" and "V". In the other words, with some confusion, i.e. bad recognition, i.e. one pattern has two or three candidates, the letter with the high probability can be chosen, but it can be concluded from the better result, i.e. the cases in that the letters can be recognized with high probability that all those letters could be recognized or classified by only two reference patterns "E" and "V". Such good result could not be obtained in the prior art correlation processing method using commonly a auto-correlation.

In this example, the set of the reference patterns can be made as shown in FIGS. 18 and 19, the set of the reference patterns E and V can discriminate completely three patterns H, N and W, and the separation of the other letters is not enough.

Furthermore, it is apparent from the result of FIG. 10 that there are two groups of letters, namely, T, L and I, as well as K and M in which group the letters are especially apt to be confused with each other. This is due to the fact that each of the letters in its respective group has common features. In this situation, the letter with the high probability is selected so as to easily provide the recognition or the classification. However, even when it is desired to obtain complete recognition of the letters using a small number of the reference patterns, the complete recognition can be accomplished merely by simple processing. The processing in which one reference pattern to produce membership function without an overlapping range in response to the confusable letter should be entered or added into the set of the reference patterns can accomplish the complete recognition or classification of the letters. The "fuzzy system theory" AND calculation can be used to identify a different letter, even when it has only one membership value of zero.

Furthermore, the present invention can deal with the situation in which the classes or patterns to be classified or recognized are larger, i.e. the number of the classes or patterns is increased. The membership functions in response to the increased number of the classes or the patterns, can be easily estimated in accordance with the above-described method. In this case, it is unnecessary to change the weight of the connection of the neurons of the artificial neural network. When the number of classes or patterns to be reviewed is increased in the artificial neural network, one could think that problems of increased retraining time due to the increased number of the neurons which is used would result. However, this was not found to be the case, using the method of recognition or classification of patterns, according to the present invention.

When the method of the present invention is applied to the association of patterns to be reviewed, the width or the range of the membership function may be increased or made larger than the range of the above-described membership functions. Especially, the original (perfect) pattern can be associated or regenerated from an imperfect pattern by using the wider range of the correlation intensities, i.e. extending the range of the membership functions to the lower correlation side. Furthermore, the original patterns can be associated or regenerated from the information or the patterns containing excess information, by using the wider range of the correlation intensities, i.e. by extending the range of the membership functions to the higher correlation side. The membership function may have a wider slope to extend from 3 times of the standard deviation to 4 or 5 times of the deviation.

In this case, the range of the membership function extends for region of imperfect pattern, or the pattern containing excess information, so that the degree of overlapping among the membership functions will be higher. Since there is less orthogonal regions, the number of the patterns which can be recognized or discriminated will be decreased. In order to avoid this decrease, a correlation light quantity detected should be normalized in term of whole light quantity received from the pattern to be reviewed or all of the patterns to be reviewed and the reference patterns.

For example of an optical assembly in accordance with the present invention, as shown in FIG. 22, a beam splitter 117 between a pattern display 116 and a Fourier transformation lens 121, and a whole light quantity emitted from the pattern to be reviewed and the reference patterns is detected by a two-dimensional image sensor plane 144, which is transmitted to a computer 151 so as to enable processing of the correlation. The additional optical arrangement as shown in FIG. 1 would be also used although they are not specifically shown in FIG. 22.

FIG. 22 shows schematically a portion of the optical system for normalization of the correlations as detected.

Upon using the light powers, the correlation powers corresponding to the pattern to be reviewed and each of the reference patterns are normalized to obtain normalized values as shown in FIG. 22. For example, when the correlation light power in response to each of the reference patterns is $X_N$, and the reduction of the correlation light power when the imperfect pattern is entered is $\Delta_N$, the correlation power in response to the imperfect pattern is $X_N - \Delta_N$ in non-normalization. As the normalization proceeds, the light power of the perfect pattern is A, and the reduction in the light power of the imperfect pattern is D. The normalized values of the correlation light power are represented by $X_N/A$ for the perfect pattern, and $(X_N - \Delta_N)/(A-D)$ for the imperfect pattern. Therefore, where the reduction is not significant, A>D, $(X_N-\Delta_N)/A * (1+D/A)$ for the imperfect pattern. Consequently, the difference in the normalized value is D/A, and the reduction can be lowered in such degree.

Accordingly, the number of patterns to be reviewed can be correspondingly increased. The normalization on the basis of the whole power of the pattern to be reviewed and the reference patterns can remove a fluctuation of the performance of a spatial light modulator, and its instability, and imperfection of the pattern. Since the light power of the reference patterns is represented as B, the shift due to the fluctuation of the spatial modulator is represented as E, and then, B>E, and the light powers of the correlation respectively when the pattern is perfect and imperfect are $X_N/(A+B)$, and $(X_N-\Delta_N)/(A-D+B-E)$. Further, when the fluctuation is lower, and imperfection is less, A+B>D+E. Therefore, the normalization on the basis of the light power of the pattern to be reviewed gives a reduction of (D+E)/(A+B), thereby, allowing the imperfection of the pattern and the fluctuation of the spatial light modulator can be removed to some extent.

Further, it can be used to judge whether the pattern is imperfect or not. In this case, in contrary to the association processing, if the range of the membership function including the fluctuation, is broader than the diameter of three times the standard deviation, the pattern is judged to be imperfect.

Additionally, when the peak values of the correlation output, and the average light quantity of the receiving (detection) range corresponding to the area of the correlation pattern are used for the basis to calculate a membership function, two different sets of information in response to each of the reference patterns can be afforded. Accordingly, the number of the necessary reference patterns can be further reduced, and then, more reliable recognition and classification can be obtained.

Because the dynamic range of the two-dimensional detector of detecting the correlation output will be limited, the entire light power can not, in some cases, be received. Then, the maximum of the correlation output, i.e. the peak of the correlation output should be adjusted to an upper maximum sensitivity of the two-dimensional image sensor, so that all of the peaks can be detected with the appropriate sensitivity. However, when the entire power or the average light power should be detected over a whole range of the correlation output, the power, other than the peak, can not be detected to obtain considerable height. In this case, the maximum sensitivity of the detector should be adjusted to the height, lower than the peak of the correlation output, and then, the sensitivity for detecting the light power at the neighbor of the peak position will be saturated. If this occurs, the surrounding location pattern output can be efficiently detected with a good linear response. Therefore, the effective and useful dynamic range of the detector can be used, so that the entire light power or the average power detected will be significantly useful.

In this example, a joint Fourier transform correlator was used for an optical means to produce the correlation output. When it is desired to improve the performance of recognition and classification, a joint Fourier transform correlator is not advantageous. Where the reference patterns and patterns to be reviewed are Fourier transformed in parallel, the contrast in the multiple interference fringes formed on the screen 31 of FIG. 1 is decreased, with an increase of the number of the reference patterns. Therefore, the intensities of the obtained correlation outputs are lowered, so as to decrease the dynamic range to which the membership functions are assigned or allotted, thereby lowering substantially the performance of recognition of the patterns.

Accordingly, the correlation processing method to avoid the lowering of the correlation output is more efficient. This type of processing method will be illustrated in the following example.

EXAMPLE 5

Figure 23:
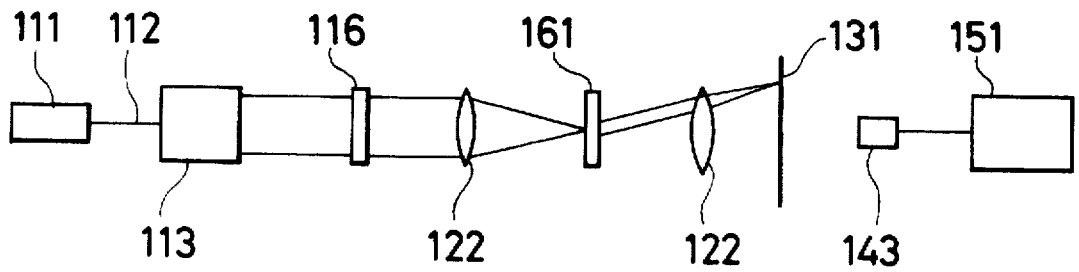
FIG. 23 shows a schematic illustration of an optical system of the other type of the optical correlation processing device to be used for the inventive optical method of recognition and classification.

FIG. 23 shows schematically an optical arrangement for regeneration of the known matched filter. A used matched filter 161 has a multiple record of multiple reference patterns, by changing the irradiation direction of a plane wave, corresponding to each of the reference patterns. The diameter of a beam 112 emitting from a laser source 111 is expanded to an appropriate diameter by a beam expander 113, and the beam irradiating the pattern to be reviewed as displayed on a display device. This beam having the complex amplitude distribution of the patterns is Fourier transformed by a Fourier transform lens 121, and then irradiates the multiple interference fringe patterns provided on the matched filter. The resulting diffraction beams are emitted in the directions of the plane waves which have been used to prepare the reference patterns, respectively from the presented reference patterns, having the frequency spectrum as that of the pattern to be recognized.

This diffraction beam is focused on a screen 131 by a focusing lens 122. One of the diffraction beams will have the cross-correlation pattern between the pattern to be reviewed and each of the reference patterns. The other diffraction beam will be a convolution. Therefore, because each position of the reference patterns to appear is known, the peak and the entire light power of the cross-correlation output can be easily detected.

These processing steps used to detect the peak and entire power of the cross-correlation pattern can be repeated, and each of the membership functions can be easily made in a similar way to that of example 4.

In this case, a matched filter does not have the overlap of auto-Fourier transform components formed from each of the reference patterns, and the contrast of the correlation output can be raised by increasing the number of the reference patterns. Therefore, the dynamic range to be lotted to the membership functions can be readily increased, and a relatively small number of the reference patterns can discriminate significantly many unknown patterns. The above-described matched filter has been prepared by a Fourier transform hologram technique. Other type of joint Fourier transform correlator can be used to obtain a similar effect to that of correlation processing.

Joint Fourier transformed patterns of each of reference patterns with the pattern to be reviewed, can be easily obtained by using array of lenses. In this method, the reference patterns can be mutually overlapped so that the problem of decreasing the contrast of the cross-correlation outputs could be removed. Reference patterns can be easily added or rewritten contrary to the matched filtering method, and more flexible processing can be enabled. For example, when a particular set of reference patterns can not discriminate enough unknown patterns, it can be easily modified by rewriting of a portion of the set of the reference patterns.

Examples 4 and 5 are based on a coherent beam system, in which the parallel shift of the input patterns formed is very great. This is due to the fact that the position of the correlation output is moved, depending on the parallel shift of the input pattern.

The next Example illustrates a relatively simple optical system which can be easily integrated.

EXAMPLE 6

FIG. 12 shows a known optical arrangement using an incoherent beam. In this arrangement, a display 16 is arranged closely to a reference pattern mask 62, so that the output of a product of a pattern to be reviewed and the reference patterns formed on the display 16 is focussed on a screen 31 by using a focus lens array 71, and then, the output from each of the reference patterns as formed on a two-dimensional image sensor 43 is detected. The patterns to be reviewed are arranged in array on a display device 16, in regions in response to the reference pattern mask 62.

In this case, the respective peak in the cross-correlations of each of the reference patterns and the pattern to be reviewed can be detected. Further, another pattern to be recognized is in sequence presented on a display device, and the same number of the membership functions as the number of the reference patterns are prepared on the basis of the output of the pattern to be recognized, in the similar way to that of Example 4. However, the parallel shift of the input pattern can be allowed in such way, but its device can be simplified, and further easily integrated.

It is noted that any kind of optical correlation processing means can be used in this example. Furthermore, various kinds of joint Fourier transform correlators means can be employed. For example, a light addressing type of liquid crystal light valve can be used in place of an electric addressing type of liquid light valve 35 in FIG. 1, using a screen 31, a two-dimensional image sensor 32 and a pattern processing device 33.

EXAMPLE 7

A microscopic photography of leukocyte of a patient can be used to determine what disease the patient suffers from (leukogram). 100 Pieces of photograph (that is, concretely, pattern signals taken by a CCD camera) of each of leukocyte A, B, C, D and E are taken, and used to produce membership functions (value) in response to each of reference patterns, e.g. a circle and a star. The number of 100 as sampled is selected from the point of statistical view to produce a certain distribution of the data. 100 Pieces of photograph of each of leukocyte A, B, C, D and E and each of a circle and a star are put in an optical assembly of FIGS. 1, 11, 12 or 22 to produce a membership function as shown in FIGS. 4 or 15 in cross-correlation with a circle and a star. The membership functions of each of leukocyte A, B, C, D and E with each of the reference patterns; circle and star are obtained and recorded in a computer. The result from each 100 pieces of photography is stored or memorized in a computer, which may include e.g. a membership function and a mean value and a standard of deviation. Then, actual photograph of a patient leukocytes is taken and then each of the leukocytes is taken to calculate membership value with each of the reference patterns; and further mean values of the membership values; a and b respectively in regard to an leukocyte photograph of the pateint with the reference patterns; a circle and a star are calculated. Then, each of the membership functions of each of leukocyte A, B, C, D and E can be compared with a and b of the patient, and further, the distribution: or histogram of the patient's leukocytes on each of leukocyte A, B, C, D and E can be obtained in a computer by repeating the above procedure on each of the patient's leukocytes. From this distribution or the histogram, one can judge the patient's desease. Or, one can judge the desease from other leukocytes which was not classified to leukocytes A, B, C, D and E.

Then, an actual photography of a patient's leukocyte is put in the optical assembly of the present invention to produce cross-correlation patterns as shown in FIG. 3. The resulting cross-correlation pattern is compared with the data stored in the computer.

The element functioning as a spatial light modulator according to the inventive method, can be of electric addressing type or of optical addressing type. Examples of the electric addressing type may be a liquid crystal panel or a ceramic element and crystal having a photoelectric effect, such as PLZT, KDP and BSO ($Bi_{12}SiO_{20}$) provided with matrix electrodes.

The optical addressing type would include a ceramic material combined with a photoconductive layer.

The material having a photo-refractive effect, such as BSO and $BaTiO_3$ can change the refractive index induced by the electric field of a photo-induced electron charge of the material depending on the quantity of the incident beam, and then, there is no need of providing a photo-conductive layer. Such spatial light modulator may be of transparent type or of reflecting type. However, when the reading-out beam will erase the entire information formed in the element of optical addressing type by the addressing beam, the wavelength range of the reading-out beam should be separated from that of the addressing beam in order to avoid the influence of the read-out beam to the recorded information.

When the element of the electric addressing type is used, the two dimensional image sensor and the driving circuit to drive the electric addressing one are necessary to produce the input image, providing an. advantage of facilitating to process those signals therefor.

The inventive method according to the present invention can be used to recognize and classify a significantly large number of unknown patterns, using a relatively lower number of reference patterns.

The uncertainty of analog processing, or optical processing of patterns can be removed by calculation of membership function considering fluctuation due to time passage of a spatial light modulator, and/or time fluctuation due to speckle noise on the basis of statistic parameters or statistic theory.

Each of the correlations between the pattern to be reviewed and each of the reference patterns is measured. Each of membership functions is then calculated, and each of membership values is estimated from the membership functions using "fuzzy system theory" AND calculation so that significantly correct recognition and classification of patterns to be reviewed can be provided.

An appropriate set of reference patterns is determined, to enable one to recognize or classify the patterns to be reviewed, quickly and accurately. If an additional pattern to be reviewed is added to the set of patterns to be recognized, an additional membership function of the respective correlation of this additional pattern with each of the reference patterns can be easily prepared, so that recognition of the additional pattern can be easily accomplished.

Even where the recognition of pattern is confused, the probability of the recognition can be easily improved by adding one or a small number of reference patterns to the old set of reference patterns so as to produce a new set of reference patterns enabling complete recognition of patterns. The width of the range of the membership function can be adjusted depending on the utility, such as recognition, classification and association of patterns, independent to the fluctuation in the optical process.

Even when imperfect patterns or pattern with excess information should be reviewed or classified, normalization of the correlation output on the basis of transmission or reflection intensities of patterns to be reviewed and the reference patterns can improve the performance of recognition of patterns. The number of the reference patterns to be compared with the pattern to be classified can be drastically reduced by our method of the present invention.

While the present invention has been described with reference to the particular illustrative embodiments, it is not to be restricted by those embodiments, but only the appended claims. It is to be appreciated that those skilled in the art can change or modify the embodiments without departing from the scope and spirit of the present invention.

We claim:

1. A method of using a computer for obtaining classification information useful in recognition and/or classifying an unknown pattern or image as belonging to a specific class, on real time basis, comprising the steps of:
   a) predetermining appropriate candidate reference patterns;
   b) measuring optically multiple times enough to produce a statistically significant result, the output of correlation between each of the candidate reference patterns and a specific pattern to be reviewed, or to which an unknown pattern shall be classified, or shall belong;
   c) providing to said computer a set of the measured data of the correlation outputs associated with each of the reference patterns and
   d) causing said computer to manipulate said set of the measured data, thereby making a first membership function by
      i) calculating a representative value for each set of the correlation outputs, from said set of the measured data of the correlation outputs measured in the step (b), for each of the reference patterns;
      ii) calculating a parameter to represent the degree of the deviation of said measured data of said correlation outputs; and
      iii) making a first membership function corresponding to each of the reference patterns in response to the specific pattern, on the basis of said representative value and said calculated parameter; and then,
   e) repeating the steps (b) to (d) with the exception of replacing the specific pattern with another specific pattern, as belonging to specific class(es), until there are obtained all of the first membership functions in regard to each of the specific patterns;

f) selecting a set of first reference patterns by

I) calculating respectively an area of the overlapping range in which said first membership functions mutually overlap between two of all candidate reference patterns; or respectively a maximum membership value within the overlapping range in which the first membership functions mutually overlap between the two of all candidate reference patterns;

II) using said respective area of the overlapping range or said maximum membership value, respectively as a standard to determine the extent of overlap between the two candidate reference patterns each in response to the specific pattern;

III) determining a combination of reference patterns having the smallest overlap as an appropriate first reference pattern to be used for recognition and/or classification of unknown patterns, on the basis of said overlapping area;

g) measuring optically the correlation between the unknown pattern and each of the first reference patterns;

h) providing to said computer a set of the measured data in step (g), of the correlation outputs in response to each of said first reference patterns;

i) estimating respectively the membership values of each of the first reference patterns, assigned to each of the specific patterns, on the basis of a set of the measured data;

j) estimating respectively the membership values or average membership value as a degree to judge how much the unknown pattern belongs to the specific pattern;

wherein said step (f) of selecting a set of the first reference patterns having the least overlap is carried out by the following steps of 1) counting the number of regions in which the area of the overlapping range at each of the candidate reference patterns, between two of the specific patterns which belong respectively to known classes exceeds the predetermined area for each of the candidate reference patterns;

2) choosing a reference pattern having the least number of the regions, and adding the reference pattern having the second lowest number of the regions, to produce a set of reference patterns;

3) counting among all combinations of two of the specific patterns, the number of the cases in which the number of reference patterns in the set matches the number of the overlap ranges of the membership functions between two specific patterns in response to each of the reference patterns having a larger area than the predetermined area;

4) stopping to add candidate reference pattern(s) to the set of reference patterns, and fixing the set of reference patterns at which the counted number of said combinations of reference patterns is less than a certain predetermined number; and using the resulting smallest membership values on the average membership value as a degree to judge how much the unknown pattern belongs to the specific pattern.

2. A method of using a computer for obtaining classification information useful in recognition and/or classifying an unknown pattern or image as belonging to a specific class, on real time basis, comprising the steps of:

a) predetermining appropriate candidate reference patterns;

b) measuring optically multiple times enough to produce a statistically significant result, the output of correlation between each of the candidate reference patterns and a specific pattern to be reviewed, or to which an unknown pattern shall be classified, or shall belong, c) providing to said computer a set of the measured data of the correlation outputs associated with each of the reference patterns; and d) causing said computer to manipulate said set of the measured data, thereby making a first membership function by i) calculating a representative value for each set of the correlation outputs, from said set of the measured data of the correlation outputs measured in the step (b), for each of the reference patterns;

ii) calculating a parameter to represent the degree of the deviation of said measured data of said correlation outputs; and iii) making a first membership function corresponding to each of the reference patterns in response to the specific pattern, on the basis of said representative value and said calculated parameter; and then, e) repeating the steps (b) to (d) with the exception of replacing the specific pattern with another specific pattern, as belonging to specific class(es), until there are obtained all of the first membership functions in regard to each of the specific patterns;

f) selecting a set of first reference patterns by

I) calculating respectively an area of the overlapping range in which said first membership functions mutually overlap between two of all candidate reference patterns; or respectively a maximum membership value within the overlapping range in which the first membership functions mutually overlap between the two of all candidate reference patterns;

II) using said respective area of the overlapping range or said maximum membership value, respectively as a standard to determine the extent of overlap between the two candidate reference patterns each in response to the specific pattern;

III) determining a combination of reference patterns having the smallest overlap as an appropriate first reference pattern to be used for recognition and/or classification of unknown patterns, on the basis of said overlapping area;

g) measuring optically the correlation between the unknown pattern and each of the first reference patterns;

h) providing to said computer a set of the measured data in the steps (g), of the correlation outputs in response to each of said first reference patterns;

i) estimating respectively the membership values of each of the first reference patterns, assigned to each of the specific patterns, on the basis of a set of the measured data;

j) estimating respectively the smallest membership values or average membership value as a degree to judge how much the unknown pattern belongs to the specific pattern;

wherein said step (f) of selecting a set of the first reference patterns having the least overlap is carried out by the following steps of 1) counting the number of regions in which the maximum membership value in the overlapping range at each of the candidate reference patterns, between two of the specific patterns which belong respectively to known classes exceeds the predetermined area for each of the candidate reference patterns;

2) choosing a reference pattern having the least number of the regions, and adding the reference pattern having the second minimum number of the regions to the set of reference patterns, to produce a set of reference patterns;

3) counting among all combinations of two of the specific patterns, the number of the cases in which the number of reference patterns in the set matches the number of the overlap ranges of the membership functions between two specific patterns in response to each of the reference patterns having a larger area than a given predetermined area;

4) stopping to add candidate reference pattern(s) to the set of reference patterns, and fixing the set of reference patterns at which the counted number of said combinations of reference patterns is less than a certain predetermined number; and using the resulting smallest membership values on the average membership value as a degree to judge how much the unknown pattern belongs to the specific pattern.

3. The method of using a computer for obtaining classification information useful in recognition and/or classifying an unknown pattern or image in accordance with claim 1, wherein said membership function has a convex curve so that a fuzzy system theory can be applied.

4. The method of using a computer for obtaining classification information useful in recognition and/or classifying an unknown pattern or image in accordance with claim 2, wherein said membership function has a convex curve so that a fuzzy system theory can be applied.

5. The method of using a computer for obtaining classification information useful in recognition and/or classifying an unknown pattern or image in accordance with claim 1, wherein said correlation output is a cross-correlation output between each of the specific patterns or unknown pattern and each of said reference patterns.

6. The method of using a computer for obtaining classification information useful in recognition and/or classifying an unknown pattern or image in accordance with claim 2, wherein said correlation output is a cross-correlation output between each of the specific patterns or unknown pattern and each of said reference patterns.

7. The method of using a computer for obtaining classification information useful in recognition and/or classifying an unknown pattern or image in accordance with claim 1, wherein said correlation output is a whole light power found in the distribution range of a cross-correlation output between the respective specific patterns or unknown pattern and each of said reference pattern.

8. The method of using a computer for obtaining classification information useful in recognition and/or classifying an unknown pattern or image in accordance with claim 2, wherein said correlation output is a whole light power found in the distribution range of a cross-correlation output between the respective specific patterns or unknown pattern and each of said reference pattern.

9. The method of using a computer for obtaining classification information useful in recognition and/or classifying an unknown pattern or image in accordance with claim 1, wherein said correlation output is an average light power found in the respective distribution range of a cross-correlation output between the respective specific patterns or unknown pattern and each of said reference patterns.

10. The method of using a computer for obtaining classification information useful in recognition and/or classifying an unknown pattern or image in accordance with claim 2, wherein said correlation output is an average light power found in the respective distribution range of a cross-correlation output between the respective specific patterns or unknown pattern and each of said reference patterns.

11. The method of using a computer for obtaining classification information useful in recognition and/or classifying an unknown pattern or image in accordance with claim 1, wherein said correlation output with the respective specific patterns or unknown pattern is the output signals from a two-dimensional image sensor.

12. The method of using a computer for obtaining classification information useful in recognition and/or classifying an unknown pattern or image in accordance with claim 2, wherein said correlation output with the respective specific patterns or unknown pattern is the output signals from a two-dimensional image sensor.

13. The method of using a computer for obtaining classification information useful in recognition and/or classifying an unknown pattern or image in accordance with claim 1, wherein said correlation output is normalized by all light quantity from all of the respective specific patterns or unknown pattern and reference patterns detected by said two-dimensional image sensor.

14. The method of using a computer for obtaining classification information useful in recognition and/or classifying an unknown pattern or image in accordance with claim 2, wherein said correlation output is normalized by all light quantity from all of the respective specific patterns or unknown pattern and reference patterns detected by said two-dimensional image sensor.

15. The method of using a computer for obtaining classification information useful in recognition and/or classifying an unknown pattern or image in accordance with claim 1, wherein said correlation output with each of said reference patterns is obtained by using a filter prepared by suing a Fourier transform hologram.

16. The method of using a computer for obtaining classification information useful in recognition and/or classifying an unknown pattern or image in accordance with claim 2, wherein said correlation output with each of said reference patterns is obtained by using a filter prepared by suing a Fourier transform hologram.

17. The method of using a computer for obtaining classification information useful in recognition and/or classifying an unknown pattern or image in accordance with claim 1, wherein said correlation output with the respective reference pattern is produced by Fourier transforming in parallel, said pattern to be reviewed and each of said reference patterns to produce an intensity pattern, and Fourier transforming optically and in parallel the resulting respective intensity pattern.

18. The method of using a computer for obtaining classification information useful in recognition and/or classifying an unknown pattern or image in accordance with claim 2, wherein said correlation output with the respective reference pattern is produced by Fourier transforming in parallel, said pattern to be reviewed and each of said reference patterns to produce an intensity pattern, and Fourier transforming optically and in parallel the resulting respective intensity pattern.

19. The method of using a computer for obtaining classification information useful in recognition and/or classifying an unknown pattern or image in accordance with claim 1, wherein said correlation outputs from each of said reference pattern are a light quantity of the reflection mode or transparent mode, that is obtained by superposing the pattern to be reviewed with each of the reference patterns expressed in term of light transparent distribution or light reflection distribution, and subsequently irradiating the pattern to be reviewed with an incoherent beam to produce a transparent or reflection beam respectively.

20. The method of using a computer for obtaining classification information useful in recognition and/or classifying an unknown pattern or image in accordance with claim 2, wherein said correlation outputs from each of said reference pattern are a light quantity of the reflection mode or transparent mode, that is obtained by superposing the pattern to be reviewed with each of the reference patterns expressed in term of light transparent distribution or light reflection distribution, and subsequently irradiating the pattern to be reviewed with an incoherent beam to produce a transparent or reflection beam respectively.

* * * * *